United States Patent
Oya

(10) Patent No.: US 10,868,938 B2
(45) Date of Patent: Dec. 15, 2020

(54) IMAGE PROCESSING APPARATUS, IMAGE PROCESSING METHOD FOR SUPPRESSING DECREASE IN SHARPNESS OF SUPERIMPOSE IMAGE, AND STORAGE MEDIUM

(71) Applicant: CANON KABUSHIKI KAISHA, Tokyo (JP)

(72) Inventor: Masashi Oya, Soka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/396,039

(22) Filed: Apr. 26, 2019

(65) Prior Publication Data

US 2019/0253578 A1  Aug. 15, 2019

Related U.S. Application Data

(63) Continuation of application No. PCT/JP2017/041739, filed on Nov. 21, 2017.

(30) Foreign Application Priority Data

Nov. 28, 2016 (JP) .................... 2016-229696
Aug. 25, 2017 (JP) .................... 2017-161799

(51) Int. Cl.
*H04N 1/00* (2006.01)
*H04N 1/23* (2006.01)
(Continued)

(52) U.S. Cl.
CPC ......... *H04N 1/233* (2013.01); *H04N 1/00267* (2013.01); *H04N 1/2361* (2013.01); *H04N 1/3871* (2013.01); *H04N 1/4092* (2013.01); *H04N 1/58* (2013.01); *H04N 1/6088* (2013.01); *G06F 3/1242* (2013.01);
(Continued)

(58) Field of Classification Search
None
See application file for complete search history.

(56) References Cited

U.S. PATENT DOCUMENTS

2010/0104176 A1*  4/2010  Hayase ............... H04N 1/3871
                                                      382/162
2011/0128294 A1*  6/2011  Manabe .................. H04N 9/31
                                                      345/581

FOREIGN PATENT DOCUMENTS

JP    2008-26879 A    2/2008
JP    2008-122558 A   5/2008
JP    2010-103863 A   5/2010

* cited by examiner

*Primary Examiner* — Benny Q Tieu
*Assistant Examiner* — Haris Sabah
(74) *Attorney, Agent, or Firm* — Canon U.S.A., Inc. IP Division

(57) ABSTRACT

An image processing apparatus that generates image data to generate a image by superimposing a first output image that is output from a first image output apparatus and a second output image that is output from a second image output apparatus, includes a first obtaining unit configured to obtain input image data, a second obtaining unit configured to obtain first output image data to be output to the first image output apparatus, and a generation unit configured to generate second output image data to be output to the second image output apparatus based on the input image data and the first output image data, in which a sharpness of an image represented by the second output image data is in accordance with a sharpness of an image represented by the first output image data.

19 Claims, 22 Drawing Sheets

(51) Int. Cl.
  *H04N 1/58* (2006.01)
  *H04N 1/409* (2006.01)
  *H04N 1/387* (2006.01)
  *H04N 1/60* (2006.01)
  *G06K 15/02* (2006.01)
  *G06F 3/12* (2006.01)
(52) U.S. Cl.
  CPC ..... *G06K 15/1843* (2013.01); *G06K 15/1857* (2013.01); *G06K 15/1889* (2013.01)

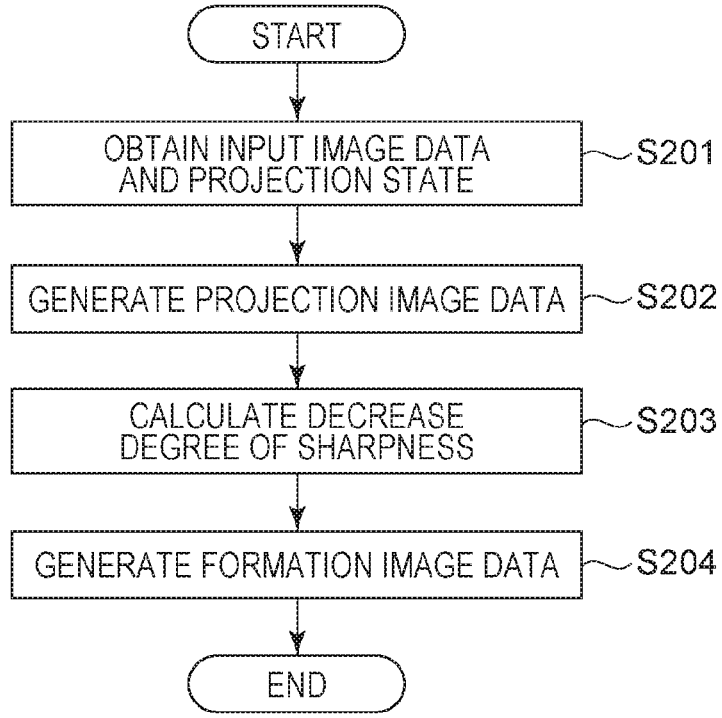
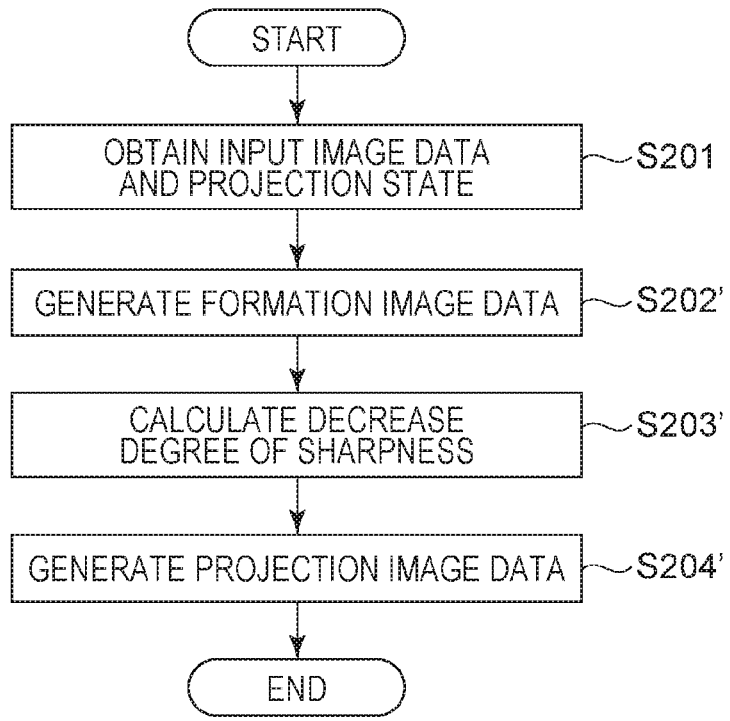

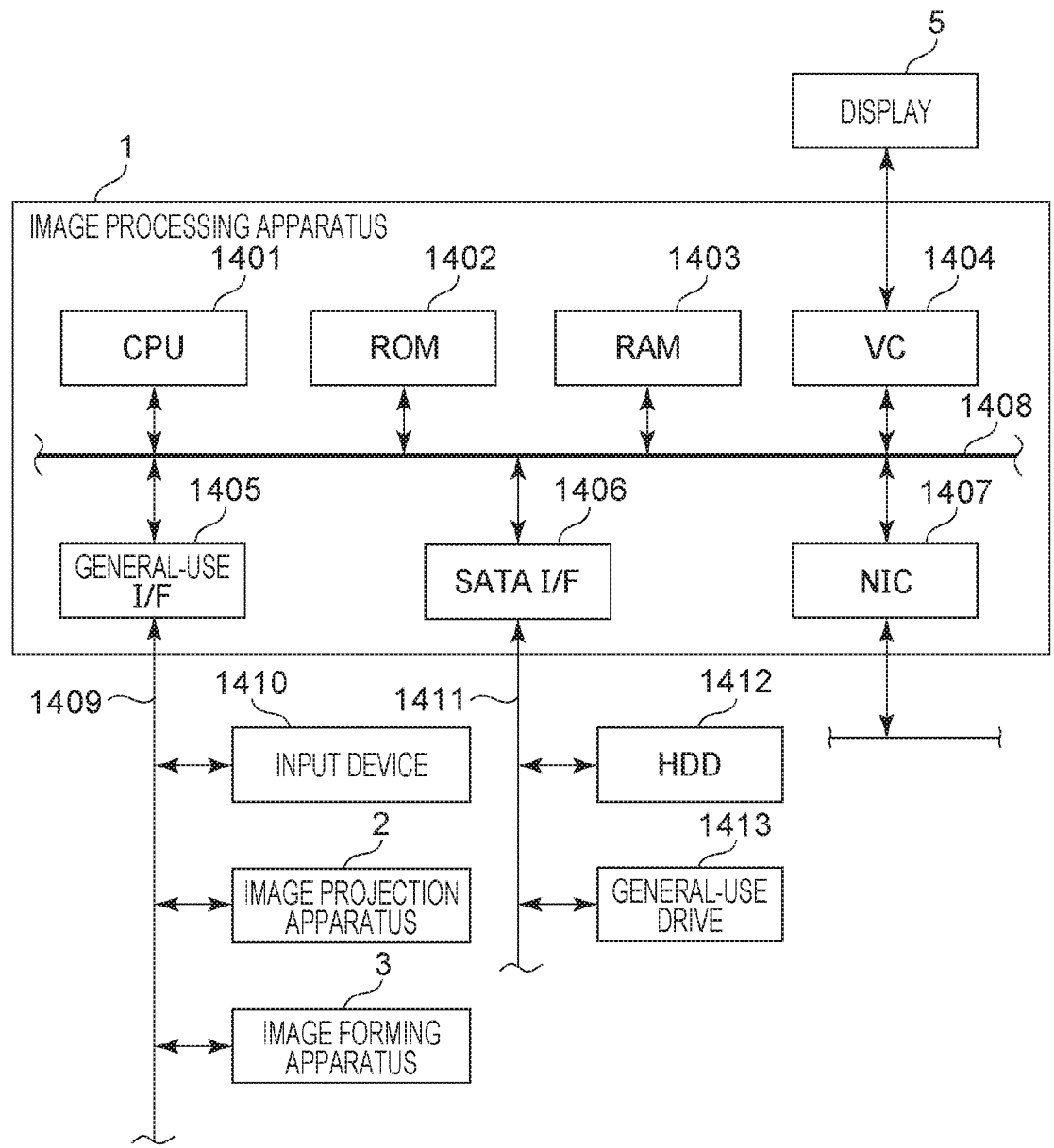

FIG. 6

| ENVIRONMENT LIGHT INFORMATION | CORRECTION COEFFICIENT |
|---|---|
| 0 | 2.0 |
| 1 | 1.8 |
| ⋮ | ⋮ |
| 16 | 1.0 |

| INPUT (INPUT IMAGE DATA) | | | OUTPUT (FORMATION IMAGE DATA) | | |
|---|---|---|---|---|---|
| R | G | B | R | G | B |
| 0 | 0 | 0 | 0 | 0 | 0 |
| 0 | 0 | 16 | 0 | 0 | 8 |
| ⋮ | ⋮ | ⋮ | ⋮ | ⋮ | ⋮ |
| 255 | 255 | 255 | 255 | 255 | 255 |

INPUT IMAGE DATA WHERE RESOLUTION CONVERSION HAS BEEN PERFORMED (R CHANNEL)

| 57 | 62 | 58 | 56 | 57 | 57 | 52 | 48 |
|----|----|----|----|----|----|----|----|
| 52 | 57 | 64 | 59 | 57 | 59 | 64 | 56 | 52 | 49 |
| 81 | 85 | 62 | 88 | 88 | 91 | 100 | 91 | 80 |
| 166 | 166 | 164 | 162 | 162 | 164 | 170 | 166 | 160 |
| 186 | 184 | 186 | 199 | 204 | 202 | 204 | 199 | 194 |
| 184 | 186 | 182 | 163 | 158 | 159 | 160 | 152 | 147 |
| 243 | 243 | 216 | 97 | 71 | 85 | 79 | 77 | 77 |
| 255 | 255 | 228 | 83 | 25 | 25 | 50 | 61 | 58 |
| 255 | 255 | 226 | 95 | 15 | 7 | 52 | 72 | 66 |

−

PROJECTION IMAGE DATA WHERE RESOLUTION CONVERSION HAS BEEN PERFORMED (R CHANNEL)

| 70 | 70 | 70 | 70 | 70 | 70 | 70 | 70 |
|----|----|----|----|----|----|----|----|
| 70 | 70 | 70 | 70 | 70 | 70 | 70 | 70 |
| 70 | 70 | 70 | 74 | 74 | 74 | 70 | 70 | 70 |
| 70 | 70 | 70 | 74 | 74 | 74 | 70 | 70 | 70 |
| 70 | 70 | 70 | 74 | 74 | 74 | 170 | 170 | 170 | 163 | 163 | 163 |
| 176 | 176 | 176 | 170 | 170 | 170 | 163 | 163 | 163 |
| 176 | 176 | 176 | 170 | 170 | 170 | 163 | 163 | 163 |
| 243 | 243 | 243 | 62 | 62 | 62 | 64 | 64 | 64 |
| 243 | 243 | 243 | 62 | 62 | 62 | 64 | 64 | 64 |
| 243 | 243 | 243 | 62 | 62 | 62 | 64 | 64 | 64 |

=

DECREASE DEGREE OF SHARPNESS (R CHANNEL)

| −13 | −8 | −6 | −16 | −18 | −17 | −13 | −18 | −22 |
|-----|----|----|----|----|----|----|----|----|
| −18 | −13 | −8 | −15 | −17 | −15 | −6 | −14 | −21 |
| 11 | 15 | 19 | 14 | 14 | 17 | 30 | 21 | 10 |
| −10 | −10 | −12 | −8 | −8 | −6 | 7 | 3 | −3 |
| 10 | 8 | 10 | 29 | 34 | 32 | 41 | 36 | 31 |
| 8 | 10 | 6 | −7 | −12 | −11 | −3 | −11 | −16 |
| 0 | 0 | −27 | 35 | 9 | 23 | 15 | 13 | 13 |
| 12 | 12 | −15 | 21 | −37 | −37 | −14 | −3 | −6 |
| 12 | 12 | −17 | 33 | −47 | −55 | −12 | 8 | 2 |

FIG. 13

INPUT IMAGE DATA AFTER EMPHASIS PROCESSING (R CHANNEL)

| 44 | 54 | 58 | 42 | 38 | 40 | 44 | 34 | 26 |
|---|---|---|---|---|---|---|---|---|
| 34 | 44 | 54 | 44 | 40 | 44 | 58 | 42 | 28 |
| 92 | 100 | 108 | 102 | 102 | 108 | 130 | 112 | 90 |
| 156 | 156 | 152 | 154 | 154 | 158 | 177 | 169 | 157 |
| 196 | 192 | 196 | 228 | 238 | 234 | 245 | 235 | 225 |
| 192 | 196 | 188 | 156 | 146 | 148 | 157 | 141 | 131 |
| 243 | 243 | 189 | 132 | 80 | 108 | 94 | 90 | 90 |
| 255 | 255 | 213 | 104 | 0 | 0 | 36 | 58 | 52 |
| 255 | 255 | 209 | 128 | 0 | 0 | 40 | 80 | 68 |

=

DECREASE DEGREE OF SHARPNESS (R CHANNEL)

| -13 | -8 | -6 | -16 | -18 | -17 | -13 | -18 | -22 |
|---|---|---|---|---|---|---|---|---|
| -18 | -13 | -8 | -15 | -17 | -15 | -6 | -14 | -21 |
| 11 | 15 | 19 | 14 | 14 | 17 | 30 | 21 | 10 |
| -10 | -10 | -12 | -8 | -8 | -6 | 7 | 3 | -3 |
| 10 | 8 | 10 | 29 | 34 | 32 | 41 | 36 | 31 |
| 8 | 10 | 6 | -7 | -12 | -11 | -3 | -11 | -16 |
| 0 | 0 | -27 | 35 | 21 | 23 | 15 | 13 | 13 |
| 12 | 12 | -15 | 21 | -37 | -37 | -14 | -3 | -6 |
| 12 | 12 | -17 | 33 | -47 | -55 | -12 | 8 | 2 |

+

INPUT IMAGE DATA WHERE RESOLUTION CONVERSION HAS BEEN PERFORMED (R CHANNEL)

| 57 | 62 | 64 | 58 | 56 | 57 | 57 | 52 | 48 |
|---|---|---|---|---|---|---|---|---|
| 52 | 57 | 62 | 59 | 57 | 59 | 64 | 56 | 49 |
| 81 | 85 | 89 | 88 | 88 | 91 | 100 | 91 | 80 |
| 166 | 166 | 164 | 162 | 162 | 164 | 170 | 166 | 160 |
| 186 | 184 | 186 | 199 | 204 | 202 | 204 | 199 | 194 |
| 184 | 186 | 182 | 163 | 158 | 159 | 160 | 152 | 147 |
| 243 | 243 | 216 | 97 | 71 | 85 | 79 | 77 | 77 |
| 255 | 255 | 228 | 83 | 25 | 25 | 50 | 61 | 58 |
| 255 | 255 | 226 | 95 | 15 | 7 | 52 | 72 | 66 |

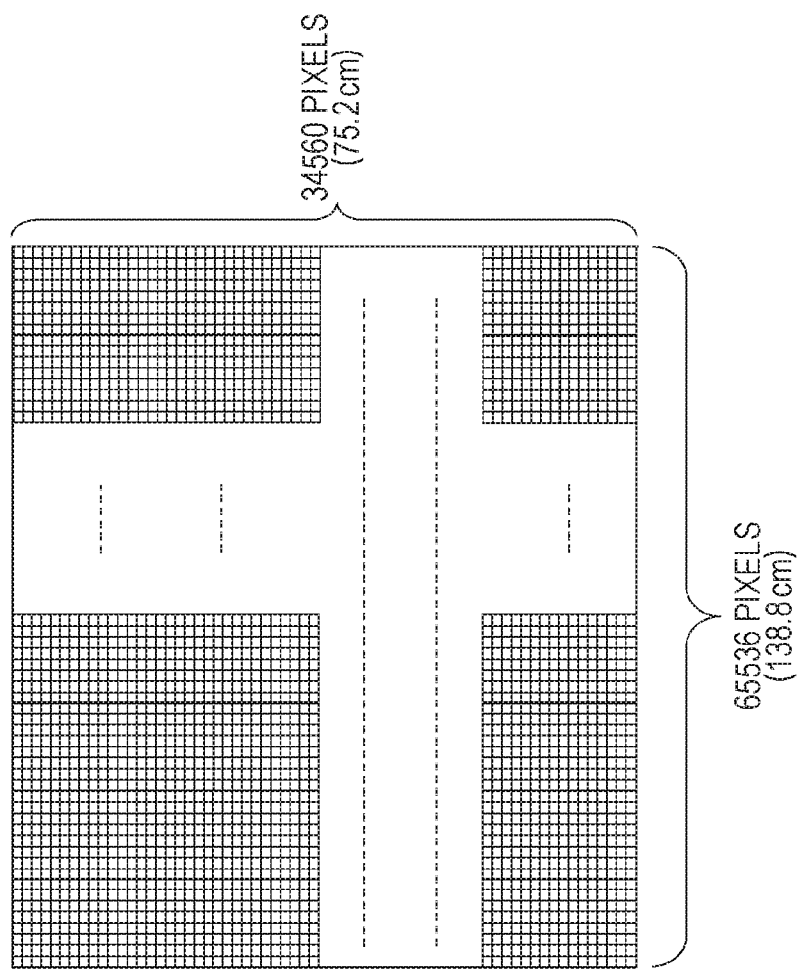
FIG. 14C
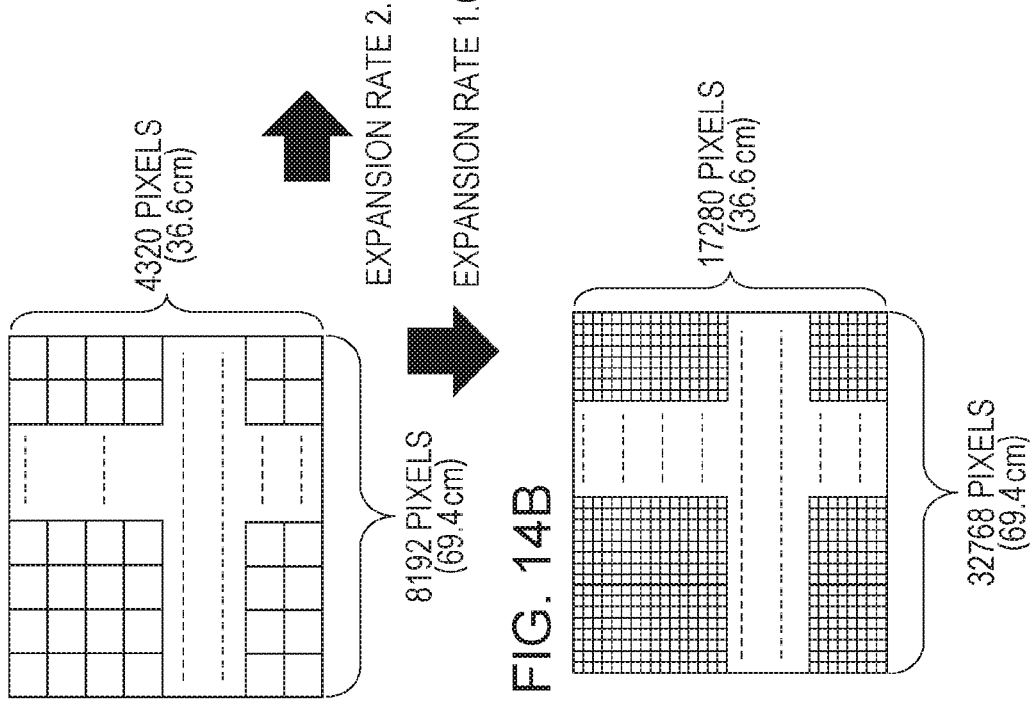
FIG. 14A
FIG. 14B

| -1 | -1 | -1 |
|----|----|----|
| -1 | 9  | -1 |
| -1 | -1 | -1 |

| -1 | -1 | -1 | -1 | -1 |
|----|----|----|----|----|
| -1 | -1 | -1 | -1 | -1 |
| -1 | -1 | 25 | -1 | -1 |
| -1 | -1 | -1 | -1 | -1 |
| -1 | -1 | -1 | -1 | -1 |

| -1 | -1 | -1 | -1 | -1 | -1 | -1 | -1 | -1 |
|----|----|----|----|----|----|----|----|----|
| -1 | -1 | -1 | -1 | -1 | -1 | -1 | -1 | -1 |
| -1 | -1 | -1 | -1 | -1 | -1 | -1 | -1 | -1 |
| -1 | -1 | -1 | -1 | -1 | -1 | -1 | -1 | -1 |
| -1 | -1 | -1 | -1 | 81 | -1 | -1 | -1 | -1 |
| -1 | -1 | -1 | -1 | -1 | -1 | -1 | -1 | -1 |
| -1 | -1 | -1 | -1 | -1 | -1 | -1 | -1 | -1 |
| -1 | -1 | -1 | -1 | -1 | -1 | -1 | -1 | -1 |
| -1 | -1 | -1 | -1 | -1 | -1 | -1 | -1 | -1 |

FIG. 19

APPARATUS INFORMATION ☒

PROJECTION STATE OF IMAGE PROJECTION APPARATUS

PROJECTION DISTANCE [m]
3.0 ◀ SELECTED
FIELD ANGLE [rad]
0.8

| 7 | 8 | 9 | D |
|---|---|---|---|
| 4 | 5 | 6 | E |
| 1 | 2 | 3 | L |
| 0 | . | ↑ | ↓ |

OUTPUT RESOLUTION OF IMAGE PROJECTION APPARATUS

○ 75 [dpi]   ○ 300 [dpi]
● 150 [dpi]  ○ 600 [dpi]

OUTPUT RESOLUTION OF IMAGE FORMING APPARATUS

○ 300 [dpi]   ● 1200 [dpi]
○ 600 [dpi]   ○ 2400 [dpi]

| DECIDE | CANCEL |

IMAGE PROCESSING APPARATUS, IMAGE PROCESSING METHOD FOR SUPPRESSING DECREASE IN SHARPNESS OF SUPERIMPOSE IMAGE, AND STORAGE MEDIUM

CROSS-REFERENCE TO RELATED APPLICATIONS

This application is a Continuation of International Patent Application No. PCT/JP2017/041739, filed Nov. 21, 2017, which claims the benefit of Japanese Patent Application No. 2016-0229696, filed Nov. 28, 2016 and Japanese Patent Application No. 2017-161799, filed Aug. 25, 2017, both of which are hereby incorporated by reference herein in their entirety.

TECHNICAL FIELD

The present invention relates to an image processing technology for reproducing a single image by combining images respectively output from a plurality of devices with each other.

BACKGROUND ART

In recent years, the number of occasions to deal with an image having a higher resolution and a wider dynamic range has been increased in imaging by a digital camera or the like or computer graphics (CG) rendering. Similarly, demands for the image reproduction as described above by an output device such as a printer have also been increased. With respect to this demand, use of a projector, a large-scale printer, or the like that can reproduce a color, a gradation, a texture, and the like of a real entity (subject) or a CG object at an impressive size is being expected. A technology for reproducing a single image by superimposing images respectively output from a plurality of devices on each other includes a technology disclosed in PTL 1. According to PTL 1, the technology is disclosed for superimposing an image projected by an image projection apparatus on a print product formed by an image forming apparatus to extend a color reproduction range in a dark area of an image to be reproduced as compared with a case where only the image projection apparatus is used.

CITATION LIST

Patent Literature

PTL 1 Japanese Patent Laid-Open No. 2010-103863

When the images output from the plurality of devices are superimposed on each other as described above, the images having different resolutions are superimposed on each other in some cases. In this case, an issue occurs that a sharpness of the image to be reproduced by the superimposing of the images output from the respective devices becomes lower than a sharpness of an input image. This issued will be described while a case where the image output by the image projection apparatus and the image output by the image forming apparatus are superimposed on each other is used as an example. Since the number of pixels of the image projected by the image projection apparatus is constant, a resolution of an image that can be output is decreased in inverse proportion to an increase in the size of the image. For this reason, in a case where the same image data is input to the image forming apparatus and the image projection apparatus to be elongated and output, the resolution of the image output by the image projection apparatus becomes lower than the resolution of the image output by the image forming apparatus. Because of the decrease in the resolution, information held by the resolution of the input image data is not to be fully represented, and the sharpness is decreased. When the images output from the respective devices are superimposed on each other in this case, since the sharpness of the image output by the image projection apparatus is decreased, the sharpness of the image to be reproduced by the superimposing of the images output from the respective devices becomes lower than the sharpness of the input image.

The present invention is aimed at providing image processing for suppressing a decrease in sharpness of a superimposed on respect to the input image which occurs when a single image is generated by superimposing the images output from the plurality of apparatuses on each other on the basis of the input image.

SUMMARY OF INVENTION

To address the above-described issue, an image processing apparatus according to an aspect of the present invention relates to an image processing apparatus that generates, to generate a image by superimposing a first output image that is output from a first image output apparatus based on an input image and a second output image that is output from a second image output apparatus based on the input image and has a higher resolution than the first output image on each other, image data to be output to the second image output apparatus. The image processing apparatus includes a first obtaining unit configured to obtain input image data representing the input image, a second obtaining unit configured to obtain first output image data to be output to the first image output apparatus which is generated based on the input image data, and a first generation unit configured to generate second output image data to be output to the second image output apparatus based on the input image data and the first output image data, in which a sharpness of an image represented by the second output image data is in accordance with a sharpness of an image represented by the first output image data.

Further features of the present invention will become apparent from the following description of exemplary embodiments with reference to the attached drawings.

BRIEF DESCRIPTION OF DRAWINGS

FIG. 2A is a flow chart with regard to processing executed by the image processing apparatus 1.

FIG. 2B is a flow chart with regard to the processing executed by the image processing apparatus 1.

FIG. 4 is a block diagram illustrating an example of a hardware configuration of the image processing apparatus 1.

FIG. 6 illustrates an example of an LUT 113 for deciding a correction coefficient in accordance with environment light information.

FIG. 7 illustrates an example of a second color conversion LUT 108 for generating formation image data.

FIG. 12 schematically illustrates an example of the processing for calculating the decrease degree of the sharpness.

FIG. 13 schematically illustrates an example of processing for emphasizing a sharpness of an image.

FIG. 14A is a conceptual diagram schematically illustrating a relationship between an image of a reproduction target and an image output by an image forming apparatus.

FIG. 14B is a conceptual diagram schematically illustrating the relationship between the image of the reproduction target and the image output by the image forming apparatus.

FIG. 14C is a conceptual diagram schematically illustrating a relationship between the image of the reproduction target and the image output by the image forming apparatus.

FIG. 16A is a schematic diagram illustrating an example of a high-pass filter in accordance with the magnification.

FIG. 16B is a schematic diagram illustrating an example of the high-pass filter in accordance with the magnification.

FIG. 16C is a schematic diagram illustrating an example of the high-pass filter in accordance with the magnification.

FIG. 19 illustrates an example of a user interface (UI) screen for accepting an input by a user.

DESCRIPTION OF EMBODIMENTS

Figure 1:
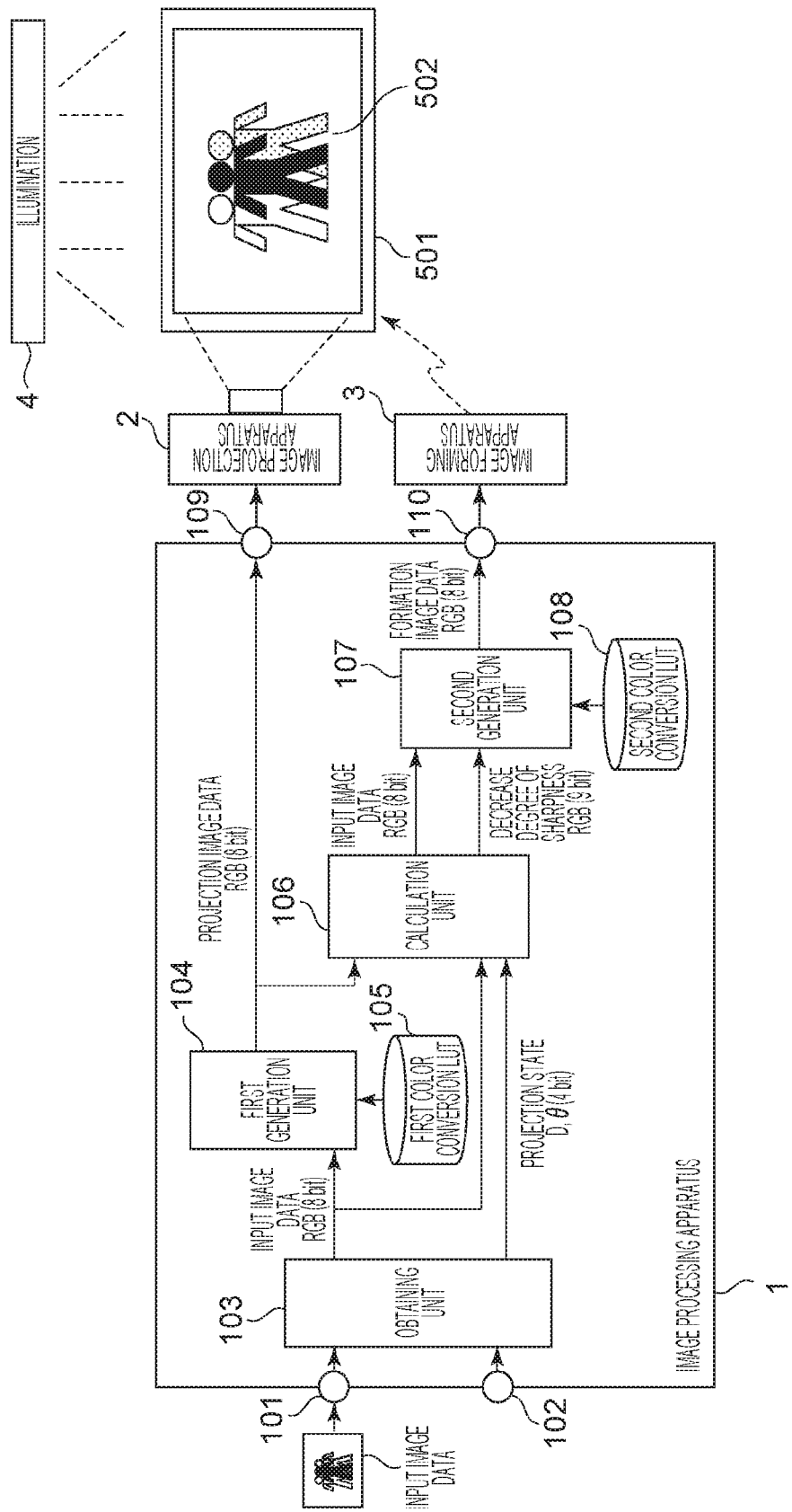
FIG. 1 is a block diagram illustrating an example of a functional configuration of an image processing apparatus 1.

Hereinafter, embodiments of the present invention will be described with reference to the drawings. It should be noted that the same configuration will be assigned with the same reference sign for descriptions.

First Embodiment

Relationship Between Image of Reproduction Target and Image Output by Device First, a relationship between an image of a reproduction target and an image output by an image forming apparatus and a relationship between the image of the reproduction target and an image output by an image projection apparatus will be described with reference to FIGS. 14A to 14C and FIGS. 18A to 18C. It should be noted that a resolution according to the present embodiment is also represented as a scale of fineness of representation in a projected or formed image, and dot per inch (dpi) is used as a unit. In addition, a sharpness according to the present embodiment is a scale of clarity in a fine part (high-resolution part) of the image. For example, the sharpness can be represented by a response function modulation transfer function (MTF) that is presented by a proportion of a decrease in an output contrast with respect to an input contrast at each of the resolutions. A case where the proportion of the decrease in the contrast is low and a responding property is satisfactory is represented that the sharpness is high, and a case where the proportion of the decrease in the contrast is high and the responding property is unsatisfactory is represented that the sharpness is low.

FIG. 14A illustrates input image data (also referred to as first image data) representing an image of a reproduction target. FIG. 14B illustrates formation image data (also referred to as second image data) representing an image having the same size as the input image data (expansion rate 1.0), and FIG. 14C illustrates formation image data representing an image having a size twice as large as the input image data (expansion rate 2.0). It should be noted that the formation image data is image data to be input for the image forming apparatus to form an image on a recording medium. FIGS. 14A to 14C illustrate input image data representing an image at a resolution 300 dpi having a size of 8192 pixels in a horizontal direction and 4320 pixels in a vertical direction and an example of an image formed on the basis of the input image data by the image forming apparatus that can form an image at the resolution 1200 dpi. The image forming apparatus forms an image by scanning a recording head from which ink is ejected plural times with respect to the recording medium. Since a distance between the recording medium and the recording head is constant irrespective of a size of the image to be formed, the resolution of the image formed by the image forming apparatus becomes constant. For example, as illustrated in FIGS. 14A to 14C, in a case where an image at the resolution 300 dpi is output by the above-described image forming apparatus at the resolution 1200 dpi, the number of pixels of the image represented by the formation image data is both vertically and horizontally quadrupled with respect to the number of pixels of the image represented by the input image data. In addition, in a case where the image is to be formed at an image size twice as large as the image represented by the input image data, the number of pixels of the image represented by the formation image data is both vertically and horizontally doubled with respect to the number of pixels of the image represented by the input image data. With the above-described configuration, the image forming apparatus sets the resolution of the output (formed) image to be constant.

Figure 18:
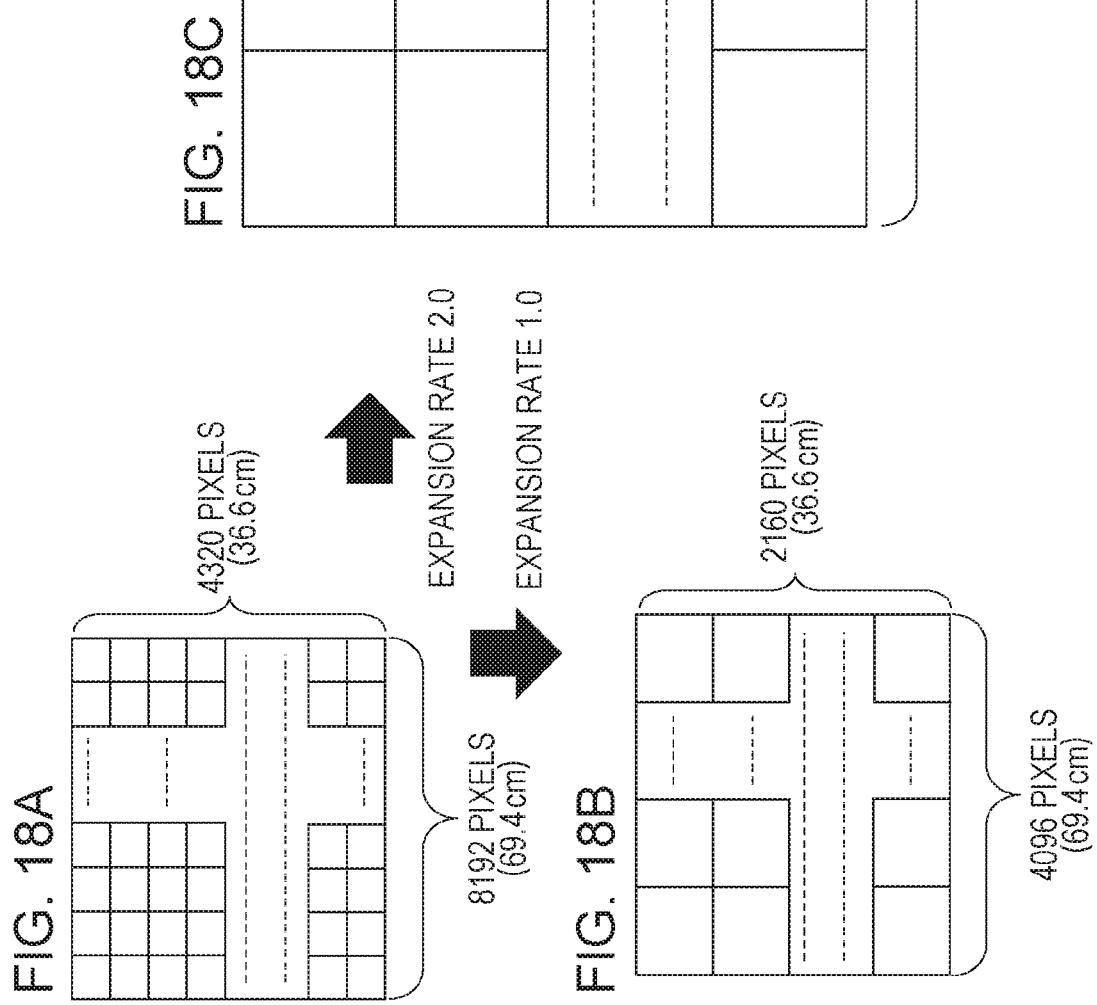
FIG. 18A is a conceptual diagram schematically illustrating a relationship between the image of the reproduction target and an image output by an image projection apparatus.
FIG. 18B is a conceptual diagram schematically illustrating the relationship between the image of the reproduction target and the image output by the image projection apparatus.
FIG. 18C is a conceptual diagram schematically illustrating the relationship between the image of the reproduction target and the image output by the image projection apparatus.

FIG. 18A illustrates the input image data representing the image of the reproduction target, and FIG. 18B illustrates projection image data (also referred to as second image data) representing an image having a size (supposed to be the "same" size) in a case where the image represented by the input image data is projected at the number of pixels of the image projection apparatus (expansion rate 1.0). Furthermore, FIG. 18C illustrates projection image data representing an image the size of the projected image is set to be twice (expansion rate 2.0) as large as the "same" size. It should be noted that the projection image data is image data to be input for the image projection apparatus to project the image. In FIGS. 18A to 18C, the input image data is similar to that of FIGS. 14A to 14C, and the image output by the number of pixels of the image projection apparatus illustrates an example of 4096 pixels in the horizontal direction and 2160 pixels in the vertical direction. The image projection apparatus is different from the image forming apparatus and generates an image by driving a display element such as a liquid crystal panel for each pixel to display the image by projecting the generated image by a projector lens. For this reason, the number of pixels of the output image is decided by the previously held display element such as the liquid crystal panel, and the number of pixels is not to be increased or decreased like the image forming apparatus. As a result, as illustrated in FIGS. 18A to 18C, the number of pixels of the projected image is constant in a case where the image is projected at the same size on the basis of the input image data representing the image at the resolution 300 dpi and a case where the image is projected at the double size. For this reason, the resolution of the image is decreased in inverse proportion to the increase in the size of the image to be projected.

As described above, since the image forming apparatus can increase or decrease the number of pixels of the output image depending on the scanning method of the recording head, the image can be formed at the constant resolution irrespective of the image size. On the other hand, since the number of pixels of the output image is decided by the display element such as the liquid crystal panel in the image projection apparatus, the resolution of the image is decreased in inverse proportion to the increase in the image size when the input image is elongated and projected. That is, the output image by the image forming apparatus has the constant sharpness irrespective of the size of the reproduction target image, but the output image by the image projection apparatus has a larger pixel size as the size of the reproduction target image is increased, and the sharpness in a case where the image is viewed from the same position is decreased. According to the present embodiment, the image projected by the image projection apparatus and the image formed by the image forming apparatus are superimposed on each other to reproduce a single image. At this time, the decrease in the sharpness of the image projected by the image projection apparatus as described above is compensated by emphasizing the sharpness of the image formed by the image forming apparatus. The detail thereof will be described below.

Hardware Configuration of Image Processing Apparatus 1

FIG. 4 illustrates a hardware configuration example of an image processing apparatus 1 according to the present embodiment. The image processing apparatus 1 is, for example, a computer and is provided with a central processing unit (CPU) 1401, a read only memory (ROM) 1402, and a random access memory (RAM) 1403. The CPU 1401 executes an operating system (OS) and various programs stored in the ROM 1402, a hard disc drive (HDD) 1412, or the like while the RAM 1403 is used as a work memory. In addition, the CPU 1401 controls the respective configurations via a system bus 1408. It should be noted that processing based on a flow chart which will be described below is executed while a program code stored in the ROM 1402, the HDD 1412, or the like is developed in the RAM 1403 to be executed by the CPU 1401. A display 5 is connected to a video card (VC) 1404. An input device 1410 such as a mouse or a key board, an image projection apparatus 2, and an image forming apparatus 3 are connected to a general-use interface (I/F) 1405 via a serial bus 1409. A general-use drive 1413 that performs read and write with respect to the HDD 1412 and various recording media is connected to a serial ATA (SATA) I/F 1406 via a serial bus 1411. A network interface card (NIC) 1407 performs input and output of information with an external apparatus. The CPU 1401 uses the various recording media mounted to the HDD 1412 or the general-use drive 1413 as storage locations for various data. The CPU 1401 displays a user interface (UI) provided by the program to the display 5 and receives an input such as a user instruction accepted via the input device 1410.

Functional Configuration of Image Processing Apparatus 1

FIG. 1 is a block diagram illustrating a functional configuration of the image processing apparatus 1. FIG. 1 illustrates the image processing apparatus 1, the image projection apparatus (projector) 2, the image forming apparatus (printer) 3, and an illumination 4 that decides environmental light at the time of an observation of a superimposed image. The superimposed image represents a projected image 502 projected by the image projection apparatus 2 which is superimposed on a formed image 501 formed on the recording medium by the image forming apparatus 3. It should be noted that the image processing apparatus 1 may be implemented by a printer driver installed in a general personal computer, for example. In this case, respective units of the image processing apparatus 1 which will be described below are realized when the computer executes a predetermined program. In addition, as another configuration, for example, a configuration may be adopted in which the image projection apparatus 2 and the image forming apparatus 3 are included in the image processing apparatus 1.

The image processing apparatus 1 and the image projection apparatus 2 are connected to each other and the image processing apparatus 1 and the image forming apparatus 3 are connected to each other via an interface or a circuit. The image processing apparatus 1 includes a first input terminal 101, a second input terminal 102, an obtaining unit 103, a first generation unit 104, a color conversion look-up table (LUT) 105, a calculation unit 106, a second generation unit 107, a second color conversion LUT 108, a first output terminal 109, and a second output terminal 110. The obtaining unit 103 obtains the input image data representing the image of the reproduction target via the first input terminal 101. In addition, a projection state of the image projection apparatus 2 is obtained the second input terminal 102. The projection state will be described below. The first generation unit 104 refers to the color conversion LUT 105 on the basis of the above-described input image data and generates the image data to be input to the image projection apparatus 2 (projection image data). The calculation unit 106 obtains the input image data and the projection image data and converts the resolution of the image represented by the input image data and the resolution of the image represented by the projection image data in accordance with the projection state. Furthermore, a decrease degree in the sharpness of the image represented by the projection image data with respect to the image represented by the input image data is calculated on the basis of the input image data and the projection image data in which the resolution has been converted. The second generation unit 107 emphasizes the sharpness of the image represented by the input image data on the basis of the input image data and the decrease degree in the sharpness. Furthermore, the second color conversion LUT 108 is referred to on the basis of the input image data representing the image in which the sharpness has been emphasized to generate the image data input to the image forming apparatus 3 (formation image data). The projection image data generated by the first generation unit 104 is output to the image projection apparatus 2 via the first output terminal 109, and the formation image data generated by the second generation unit 107 is output to the image forming apparatus 3 via the second output terminal 110.

Configuration and Operation of Image Projection Apparatus 2

The image projection apparatus 2 includes a projection optical unit (not illustrated). The projection optical unit is provided with a lamp functioning as a light source, a liquid crystal driving apparatus configured to drive liquid crystal panels on the basis of the input projection image data, and the projector lens. Light from the lamp is separated into lights of R, G, and B by an optical system to be respectively guided to the liquid crystal panels. The lights guided to the respective liquid crystal panels are subjected to luminance modulation on the respective liquid crystal panels to project images on a printed product formed by the image forming apparatus 3 by the projector lens.

Configuration and Operation of Image Forming Apparatus 3

The image forming apparatus 3 vertically and horizontally moves the recording head (not illustrated) relatively with respect to the recording medium and records ink dots on the recording medium to form the image on the basis of the formation image data generated in the image processing apparatus 1. According to the present embodiment, the image forming apparatus 3 uses a printer of an inkjet method, but a printer of another method such as an electrophotographic method may also be used.

Processing Contents of Image Processing Apparatus 1

Next, processing contents of the image processing apparatus 1 provided with the above-described functional configuration will be described with reference to a flow chart of FIG. 2A. Hereinafter, respective steps (processes) are represented by adding S in front of reference signs.

In S201, the obtaining unit 103 obtains the input image data via the first input terminal 101. The input image data is color image data having three channels in which RGB values respectively having 8 bits are recorded in the respective pixels. In addition, it is assumed that the image represented by the input image data has a higher resolution than the resolution of the image projected by the image projection apparatus 2. That is, the image projected by the image projection apparatus 2 has a lower resolution than the image represented by the input image data. The input image data obtained by the obtaining unit 103 is transmitted to the first generation unit 104, the calculation unit 106, and the second generation unit 107. Furthermore, the projection state is obtained via the second input terminal. The projection state is a distance (projection distance) between the image projection apparatus 2 and the formed image 501 set as a projection target and a field angle determined from a relationship between the projector lens and the liquid crystal panel when the image projection apparatus 2 projects the projected image 502. The projection state is obtained as 4-bit data in which a projection distance D is converted in meters (m) and a field angle θ is converted in radians. The projection state is obtained by accepting an input from a user via a UI screen illustrated in FIG. 19 or is directly obtained by the image projection apparatus 2 by connecting the image projection apparatus 2 and the image processing apparatus 1 to each other.

Figure 3:
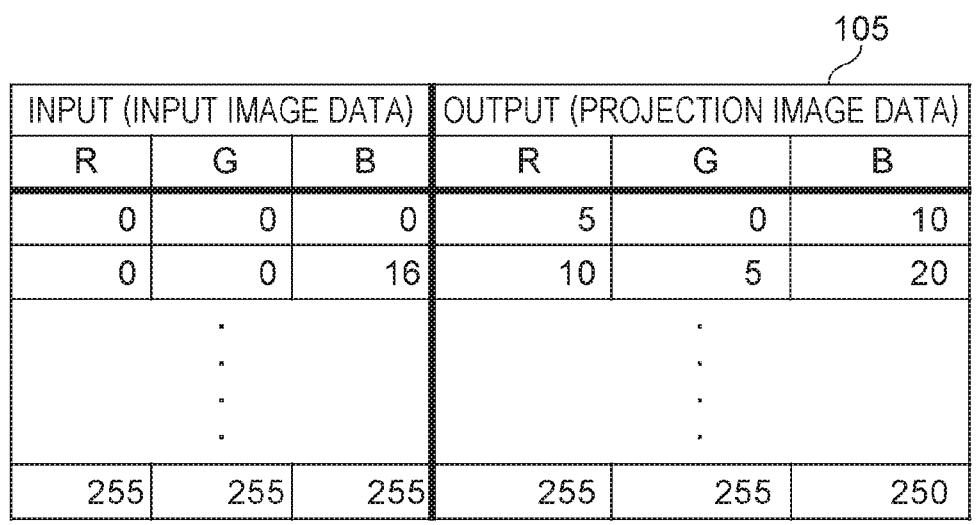
FIG. 3 illustrates an example of a color conversion look-up table (LUT) 105 for generating projection image data.

In S202, the first generation unit 104 converts the resolution of the image represented by the input image data obtained by the obtaining unit 103 on the basis of the number of pixels of the output image of the image projection apparatus 2. The related-art bicubic method is used for the conversion of the resolution, but another resolution conversion method such as a bilinear method may also be used. Furthermore, the previously held the second color conversion LUT 108 is referred to on the basis of the input image data representing the image in which the resolution has been converted to generate the projection image data. The color conversion LUT 105 to which the reference is made is illustrated in FIG. 3. As illustrated in FIG. 3, correspondence relationships between signal values (RGB values) recorded in the respective pixels of the input image data and signal values (RGB values) recorded in the respective pixels of the projection image data are held. The color conversion LUT 105 described above is previously created by projecting a chart in which the input signal value recorded in the projection image data is already found to measure a color of the projected image. The projection image data to be generated is color image data having the three channels in which the RGB values respectively having 8 bits are recorded in the respective pixels similarly as in the input image data. When the projection image data is generated, the projection image data is transmitted to the image projection apparatus 2 via the first output terminal 109. The projection image data is also transmitted to the calculation unit 106.

Figure 5A:
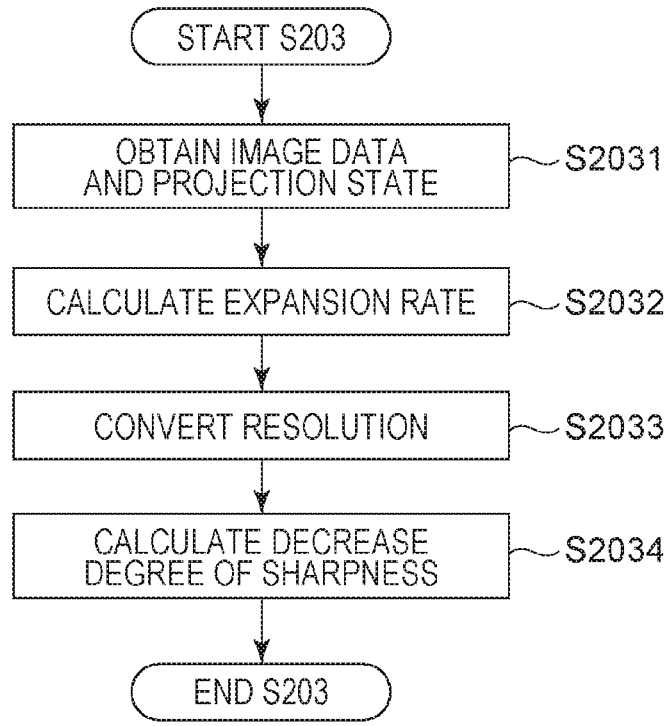
FIG. 5A is a flow chart with regard to processing (S203) for calculating a decrease degree of a sharpness.

In S203, the calculation unit 106 obtains the input image data and the projection state obtained in S201 and the projection image data generated in S202. Furthermore, an expansion rate E of the size of the image projected by the image projection apparatus 2 with respect to the size of the image represented by the input image data is calculated on the basis of the obtained projection state. The expansion rate E mentioned herein is a magnification used when the image is expanded. The resolution of the image represented by the projection image data and the resolution of the image represented by the input image data are converted on the basis of the calculated expansion rate E. After the resolution is converted, the decrease degree in the sharpness of the image represented by the projection image data with respect to the image represented by the input image data is calculated. The calculated decrease degree in the sharpness is transmitted to the second generation unit. Hereinafter, the detailed processing in S203 will be described with reference to the flow chart illustrated in FIG. 5A.

In S2031, the input image data, the projection image data, and the projection state are obtained. In S2032, the expansion rate E is calculated by using the following expression (1) on the basis of the obtained projection state (D and θ) and the projection state (the projection distance Do and the field angle $θ_0$) in which the size of the image represented by the input image data becomes the same as the size of the projected image 502.

$$E = D/D_0 + θ/θ_0 \qquad (1)$$

It should be noted that the above-described projection state ($D_0$ and $θ_0$) in which the same size is established is previously decided by the following method to be held in the calculation unit 106. The decision is made when the projection image data generated on the basis of the input image data in which the image size is previously found is projected to search for the projection state in which the image size of the projected image 502 after the projection is matched with the size of the image represented by the input image data. It should be noted that the projection state may be calculated by constructing a calculation expression on the basis of characteristics of the projector lens and the liquid crystal panel included in the image projection apparatus 2 and using the calculation expression. It should be noted that only the projection distance D may be obtained as the projection state in S2031, and the expansion rate E may be calculated by dividing the projection distance D by $D_0$ in S2032.

In S2033, the resolution of the image represented by the input image data and the resolution of the image represented by the projection image data are converted on the basis of the expansion rate E calculated in S2032 and a resolution $R_f$ of the image formed by the image forming apparatus 3. In the resolution conversion of the image represented by the projection image data, first, a magnification $F_p$ of the projection image data is calculated by using the following expression (2) on the basis of the expansion rate E, the resolution $R_f$, and a resolution $R_p$ of the image projected by the image projection apparatus 2.

$$F_p = R_f/(R_p/E) \qquad (2)$$

Figure 11A:
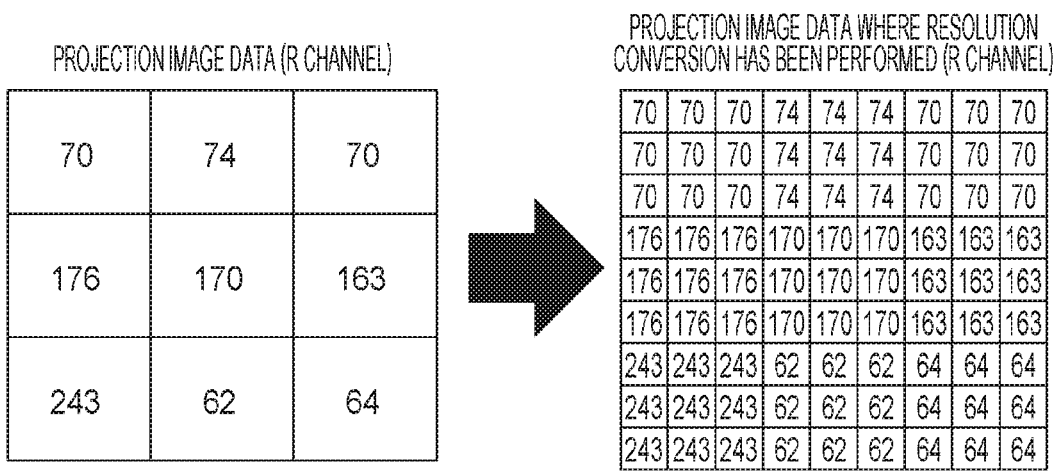
FIG. 11A schematically illustrates conversion processing for a resolution based on a magnification.

The resolution conversion of the respective pixels of the projection image data into $F_p$ pieces is performed on the basis of the calculated magnification $F_p$. A related-art nearest neighbor method is used for this resolution conversion. An example of the resolution conversion of the image represented by the projection image data in the case of the magnification $F_p$ of the projection image data=3 is illustrated in FIG. 11A. Since the nearest neighbor method is used, the processing becomes processing for replicating the pixel value before the conversion, and it is possible to perform the conversion into the projection image data representing an image that replicates the projected image 502 after the projection. It should be noted that another method such as the bicubic method may also be used for the conversion of the resolution instead of the nearest neighbor method.

Similarly, in the resolution conversion of the image represented by the input image data, first, the magnification $F_{in}$ of the input image data is calculated by using the following expression (3) on the basis of the expansion rate E, the resolution $R_f$, and a resolution $R_{in}$ of the image represented by the input image data.

$$F_{in} = R_f/(R_{in}/E) \qquad (3)$$

Figure 11B:
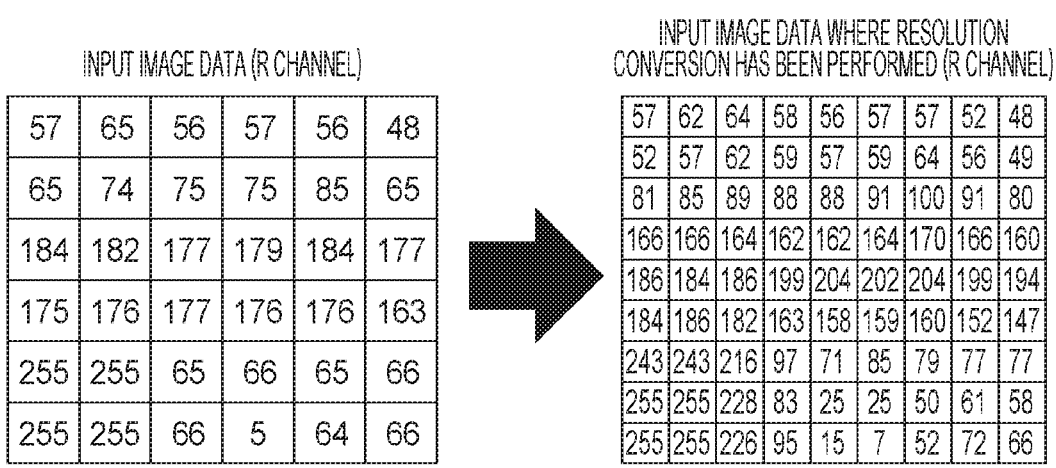
FIG. 11B schematically illustrates the conversion processing for the resolution based on the magnification.

The resolution conversion of the respective pixels of the input image data into $F_{in}$ pieces is performed on the basis of the calculated magnification $F_{in}$. The related-art bicubic method is used for this resolution conversion. An example of the resolution conversion of the image represented by the input image data in the case of the magnification $F_{in}$ of the input image data=1.5 is illustrated in FIG. 11B. When the bicubic method of converting the resolution by performing interpolation processing on the basis of a neighbor pixel value before the conversion is used, it is possible to perform the conversion into the input image data for generating the formation image data representing an image that replicates the formed image 501. It should be noted that the above-described resolutions $R_f$ and $R_p$ are obtained by the input by the user or directly obtained by connecting the image projection apparatus 2 or the image forming apparatus 3 to the image processing apparatus 1. The resolutions $R_f$ and $R_p$ are preferably set as the highest resolutions that can be output by the respective devices.

In S2034, subtraction processing of the pixel value of the input image data representing the image in which the resolution conversion has been performed in S2033 and the pixel value of the projection image data is performed, and a difference obtained as a result of the subtraction processing is set as a decrease degree in the sharpness. The decrease degree in the sharpness is calculated as color image data having the three channels in which the RGB values respectively having 8 bits are recorded in the respective pixels similarly as in the input image data and the projection image data. The subtraction processing is independently performed in each of the channels of R, G, and B with regard to the respective pixels of the respective images. A pixel value in the R channel of the input image data is set as $I\_R_{x,y}$ (x denotes the pixel position in the horizontal direction, and y denotes the pixel position in the vertical direction), and a pixel value on an R plane of the projection image data is set as $P\_R_{x,y}$. Furthermore, a pixel value on the R plane at the decrease degree in the sharpness is set as $Q\_R_{x,y}$ and is calculated by the following expression (4).

$$Q\_R_{x,y} = (I\_R_{x,y} - P\_R_{x,y}) \qquad (4)$$

FIG. 12 schematically illustrates an example in which the decrease degree in the sharpness is calculated from the input image data and the projection image data. Since similar processing is also applied to G and B planes, descriptions thereof will be omitted. After the above-described calculation is calculated for each pixel in the R channel, the processing is sequentially performed in G and B channels. Since $I\_R_{x,y}$ and $P\_R_{x,y}$ are 8-bit data representing 0 to 255, $Q\_R_{x,y}$ output from the above-described calculation becomes 9-bit data representing −255 to +255. It should be noted that the example in which the processing is sequentially performed has been described above, but the configuration is not limited to the above-described single example. For example, the calculations in the respective channels may be processed in parallel. The calculated decrease degree in the sharpness (color image data having three channels in which RGB values respectively having 9 bits are recorded in the respective pixels) is transmitted to the second generation unit 107.

In S204, the second generation unit 107 emphasizes the sharpness of the image represented by the input image data in which the resolution conversion has been performed in S2033 on the basis of the decrease degree in the sharpness which is calculated in S203. The emphasis of the sharpness is realized by performing addition processing of the pixel value of the input image data in which the resolution conversion has been performed and the pixel value of the image data representing the decrease degree in the sharpness. It is possible to suppress the decrease in the sharpness of the superimposed image by emphasizing the sharpness of the formed image 501 superimposed with the projected image 502 by the amount equivalent to the decrease in the sharpness when the image projection apparatus 2 projects the projected image 502. The addition processing is independently performed in each of the channels of R, G, and B with regard to the respective pixels of the respective images similarly as in the subtraction in S2034. A pixel value in the R channel of the input image data is set as $I\_R_{x,y}$ (x denotes the pixel position in the horizontal direction, and y denotes the pixel position in the vertical direction), and a pixel value in the R channel at the decrease degree in the sharpness is set as $Q\_R_{x,y}$. Furthermore, a pixel value in the R channel of the input image data after the addition processing is set as $I\_R'_{x,y}$ and is calculated by the following expression (5).

$$I\_R'_{x,y} = I\_R_{x,y} + Q\_R_{x,y} \qquad (5)$$

FIG. 13 schematically illustrates an example of calculating the input image data representing the image in which the sharpness has been emphasized on the basis of the input image data and the image data representing the decrease degree in the sharpness. As a result of the calculation, in a case where $I\_R_{x,y}$ becomes lower than 0, clipping processing to 0 is performed, and in a case where $I\_R_{x,y}$ becomes higher than or equal to 256, the clipping processing to 255 is performed, so that the input image data representing the image in which the sharpness has been emphasized becomes 8-bit data representing 0 to 255. Since similar processing is also applied to the G and B channels, descriptions thereof will be omitted. After the above-described calculation is performed for each pixel in the R channel, the calculation is sequentially performed in the G and B channels, but the calculation may also be performed in parallel.

Furthermore, the previously held second color conversion LUT 108 is referred to on the basis of the input image data representing the image in which the sharpness has been emphasized to generate the formation image data. The second color conversion LUT 108 to which the reference is made is illustrated in FIG. 7. As illustrated in FIG. 7, correspondence relationships between signal values (RGB values) recorded in the respective pixels of the input image data and signal values (RGB values) recorded in the respective pixels of the formation image data are held. The second color conversion LUT 108 described above is previously created by forming an image on the recording medium on the basis of a chart in which the input signal value recorded in the formation image data is already found and measuring a color of the formed image. The formation image data to be generated is color image data having the three channels in which the RGB values respectively having 8 bits are recorded in the respective pixels similarly as in the input image data. The generated formation image data is transmitted to the image forming apparatus 3 via the second output terminal 110. Thus, the series of processes for generating the projection image data and the formation image data is completed.

When the above-described processing control is performed, the decrease in the sharpness of the projected image 502 with respect to the image of the reproduction target can be compensated by emphasizing the sharpness of the formed image 501. As a result, it is possible to suppress the decrease in the sharpness in the superimposed image obtained by superimposing the projected image 502 that has been projected by the image projection apparatus 2 on the printed product (the formed image 501) formed by the image forming apparatus 3.

Modified Examples

Figure 15:
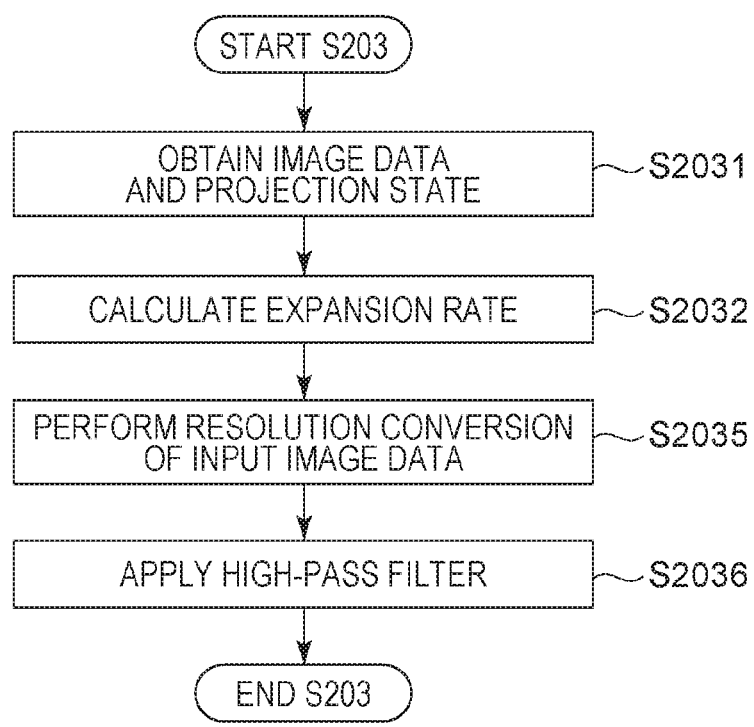
FIG. 15 is a flow chart with regard to the processing (S203) for calculating the decrease degree of the sharpness.

It should be noted that, according to the present embodiment, the example has been described in which the conversion processing of the resolution is applied to the input image data and the projection image data in accordance with the projection state, and the decrease degree in the sharpness of the image projected by the image projection apparatus 2 with respect to the image of the reproduction target is calculated on the basis of the input image data and the projection image data. However, the calculation method for the decrease degree in the sharpness is not limited to the above-described single example. For example, the decrease degree in the sharpness of the projected image 502 with respect to the image of the reproduction target may also be calculated by arithmetic processing based on the resolution $R_f$ of the image formed by the image forming apparatus 3 and the resolution $R_f$ of the image projected by the image projection apparatus 2. The detailed processing in S203 in the calculation processing for the decrease degree in the sharpness will be described with reference to the flow chart illustrated in FIG. 15.

Since S2031 and S2032 are similar to the above-described first embodiment, descriptions thereof will be omitted. In S2035, the resolution conversion is performed with respect to only the input image data on the basis of the expansion rate E calculated in S2032 and the resolution $R_f$ of the image formed by the image forming apparatus 3. Since the resolution conversion with respect to the input image data is similar to the above-described first embodiment, descriptions thereof will be omitted.

In S2036, the magnification $F_p$ is calculated by using the expression (2) similarly as in S2033 described above, and a high-pass filter having a matrix size based on the calculated magnification $F_p$ is generated to perform filter processing. FIG. 16 illustrates an example of the high-pass filter applied to a case where the magnification $F_p$ is 3, 5, and 9. As illustrated in FIG. 16, the high-pass filter having the matrix of $F_p \times F_p$ is generated, and the filter processing is performed with respect to the input image data where the resolution conversion has been performed in S2035, and a processing result is set at the decrease degree in the sharpness.

First, the image represented by the input image data is converted to have the resolution of the image formed by the image forming apparatus 3, and the sharpness of the image that can be reproduced by the image forming apparatus 3 among the sharpness of the image of the reproduction target is extracted. Next, the filter processing using the high-pass filter based on the magnification $F_p$ is performed with respect to the above-described extracted sharpness to calculate the sharpness that is to be lost when the sharpness is represented by the image projection apparatus 2. When the series of processes is executed, the sharpness which can be reproduced by the image forming apparatus 3 and also which is not to be reproduced by the image projection apparatus 2 among the sharpness of the image of the reproduction target can be calculated as the decrease degree in the sharpness described above.

The high-pass filter is generated, and the filter processing is performed by using the generated high-pass filter in the above-described modified example, but filters of a plurality of types may also be previously held. In this case, the filter for the filter processing is obtained from the previously held filters of the plurality of types in accordance with the above-described magnification or a frequency band in which the sharpness that can be calculated on the basis of the magnification is decreased.

Figure 10:
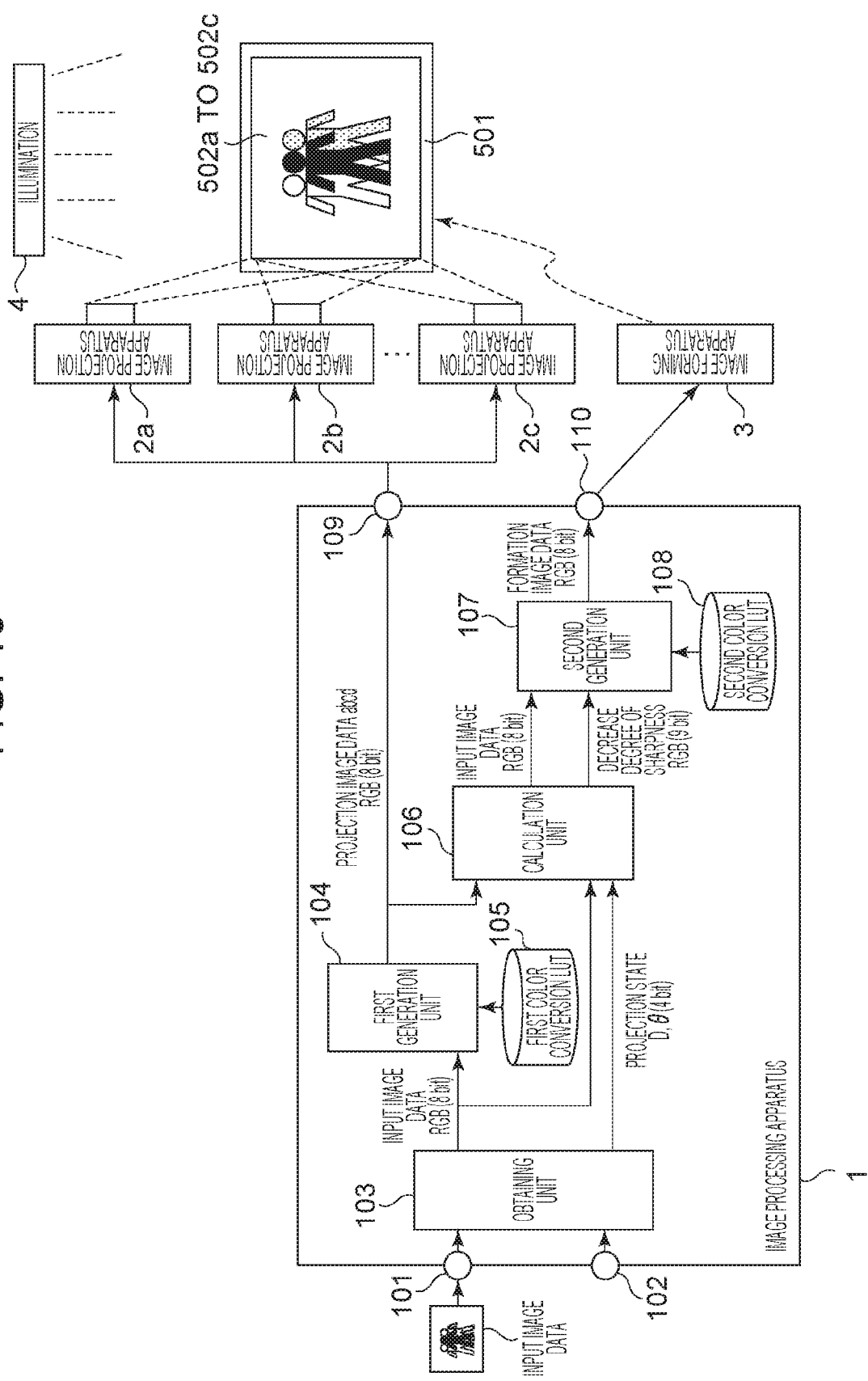
FIG. 10 is a block diagram illustrating an example of the functional configuration of the image processing apparatus 1.

The configuration example has been described in which the single image projection apparatus 2 is used according to the present embodiment, but a configuration may also be adopted in which two or more of the image projection apparatuses 2 are used. For example, as illustrated in FIG. 10, n image projection apparatuses 2a to 2c and the single image forming apparatus 3 may be used to construct a superimposed image representation system (stack projection) for superimposing n projected images by the n image projection apparatuses 2 on one another in the same position. When two or more of the image projection apparatuses 2 are used to superimpose two or more projected images on the formed image, it is possible to further expand a luminance range that can be represented by the superimposed image onto a high luminance side.

Figure 9:
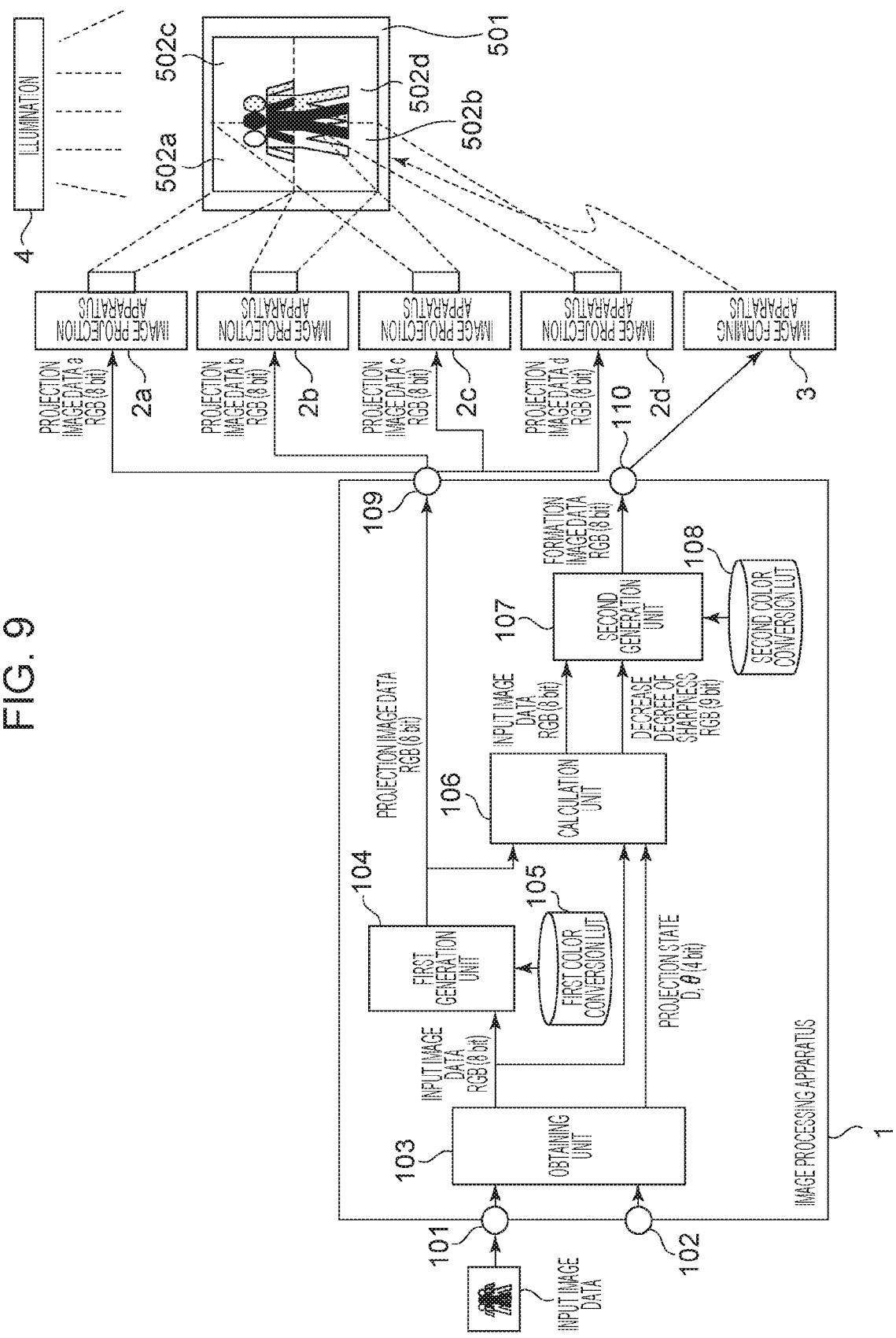
FIG. 9 is a block diagram illustrating an example of the functional configuration of the image processing apparatus 1.

In addition, for example, as illustrated in FIG. 9, four image projection apparatuses 2a to 2d and the single image forming apparatus 3 are used to perform processing for dividing the input image data into 2×2, and the pieces of projection image data generated on the basis of the input image data where the division processing has been performed are projected by the respective image projection apparatuses 2a to 2d. With the above-described configuration, a superimposed image representation system (multi projection) for superimposing the 2×2 projected images with respect to the formed image may be constructed. When the respective image projection apparatuses 2a to 2d reproduce the respective areas of the image represented by the input image data, the projected image having a higher resolution or the projected image having a larger size than the projected image projected by the single image projection apparatus 2 can be superimposed.

Figure 17:
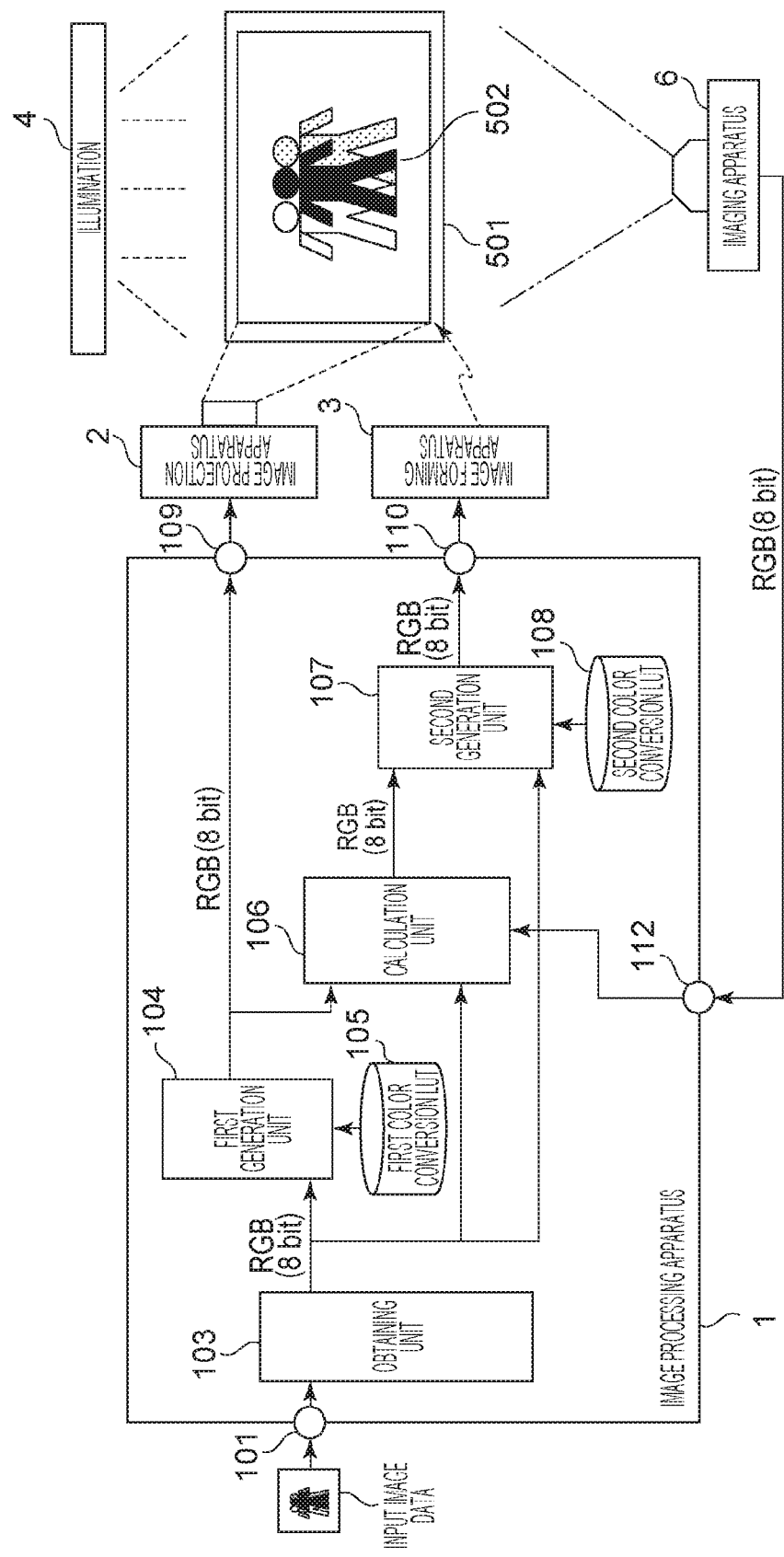
FIG. 17 is a block diagram illustrating an example of the functional configuration of the image processing apparatus 1.

In addition, according to the present embodiment, the example has been described in which the resolution of the image represented by the projection image data is matched with the resolution of the formed image 501, and the decrease degree in the sharpness is calculated on the basis of the projection image data where the resolution conversion has been performed and the input image data. However, the generation method for the projection image data used in the calculation of the decrease degree in the sharpness is not limited to the above-described single example. The functional configuration of the image processing apparatus 1 configured to calculate the decrease degree in the sharpness in the projected image 502 is illustrated in FIG. 17. As illustrated in FIG. 17, the image processing apparatus 1 is provided with an imaging apparatus 6 configured to capture the projected image 502 and a third input terminal 112 arranged to obtain data from the imaging apparatus 6. Image data obtained by capturing the projected image 502 by the imaging apparatus 6 may be set as the projection image data for calculating the decrease degree in the sharpness. As described above, when the projection image data obtained by capturing the actual projected image 502 is used, it is also possible to cope with a change in the relationship between the projection image data and the projected image 502 due to an aging degradation of the image projection apparatus 2.

In addition, according to the present embodiment, the example has been described in which the projection distance is obtained as the projection state, and the expansion rate E is calculated on the basis of the projection distance to calculate the decrease degree in the sharpness. However, the projection state is not limited to the above-described single example. For example, to suppress a situation where the shape of the projected image 502 becomes trapezoidal due to an angle φ defined by an optical axis of the image projected from the image projection apparatus 2 and the formed image 501, a related-art trapezoidal distortion correction (keystone correction) may be previously applied to the projected image 502 in some cases. In the above-described case, it is necessary to calculate the decrease degree in the sharpness on the basis of the projected image 502 to which the trapezoidal distortion correction has been applied by the defined angle φ. Hereinafter, an example will be illustrated in which the projection image data that takes φ corresponding to the projection state into account is generated.

First, the above-described defined angle φ is obtained by the first generation unit 104 as the projection state. Furthermore, related-art affine transformation parameters (trapezoidal distortion correction coefficients) for transforming the input image data into a trapezoidal image are held for each φ, and the input image data is converted into the image data representing the trapezoid image by using the affine transformation parameters in accordance with the obtained φ. The affine transformation parameters are provided with the movement amount in the horizontal direction, the movement amount in the vertical direction, the magnification in the horizontal direction, and the magnification in the vertical direction in accordance with φ for each pixel position of the input image data, for example. It should be noted that the related-art bicubic method is used for the resolution conversion at the time of the conversion into the trapezoidal image data. Thereafter, inverse transformation is performed by using the above-described affine transformation parameters with respect to the image data representing the trapezoid image to restore the same rectangular as the input image data. When the inverse conversion is performed, the related-art nearest neighbor method is used. When the nearest neighbor method of replicating the neighboring pixel is used at the time of the inverse conversion, it is possible to generate the projection image data in which the sharpness that is to be lost at the conversion into the image data representing the trapezoid image is assumed. Furthermore, the color conversion LUT 105 is referred to on the basis of the inversely converted input image data to generate the projection image data. Since the processing after the generation of the projection image data in which φ corresponding to the projection state is taken into account is the same, descriptions thereof will be omitted. It should be noted that the example has been described above in which the deformation of the input image data in accordance with the angle φ defined by the formed image 501 and the optical axis of the projected image 502 is corrected, but the configuration is not limited to the above-described single example. For example, a distortion caused by the angle defined by the liquid crystal panel and the projector lens and a distortion of the projector lens which occurs when a refraction of the projector lens is off from an ideal state towards a peripheral part from a central part may be corrected in some cases. In these cases too, the affine transformation parameters in accordance with the respective corrections may be held, and conversion processing similar to the above-described trapezoidal distortion correction may also be performed.

In addition, a luminance of the image may be decreased due to a decrease in light amount which is caused in the peripheral part as compared with the central part of the projected image 502 in some cases. For example, to correct the above-described light amount fluctuation for each position of the projected image 502, correction processing may be previously applied to the input image data in some cases. In the above-described case, it is necessary to calculate the decrease degree in the sharpness on the basis of the input image data to which the correction processing has been applied. Hereinafter, an example will be described in which the generation of the projection image data that takes α and β corresponding to the projection state into account is performed.

First, a light amount decrease amount α and a coefficient β for adjusting a light amount of the entire image are obtained for each pixel position of the projected image 502 as the projection state by the first generation unit 104. The pixel value $I\_R'_{x,y}$ of the input image data after the correction is calculated on the basis of the obtained $\alpha_{x,y}$ and $\beta_{x,y}$, the pixel value in the R channel of the input image data $I\_R_{x,y}$ (x denotes the pixel position in the horizontal direction, and y denotes the pixel position in the vertical direction), and the following expression (6).

$$I\_R'_{x,y}=(I\_R_{x,y}+\alpha_{x,y})\times\beta_{x,y} \quad (6)$$

The light amount decrease amount α and the coefficient β for adjusting the light amount of the entire image described above for each pixel position of the projected image 502 are previously decided when the image is projected on the basis of the input image data in which the signal value is already found and the projected image is measured. The color conversion LUT 105 is referred to on the basis of the input image data where the correction processing has been performed to generate the projection image data. Since the processing after the generation of the projection image data that takes α and β corresponding to the projection state into account is the same, descriptions thereof will be omitted.

In addition, according to the present embodiment, the emphasis of the sharpness of the input image data is performed by carrying out the addition processing of the pixel value of the input image data and the pixel value of the image data representing the decrease degree in the sharpness, but the emphasis processing of the sharpness is not limited to the above-described single example. For example, a correction value in accordance with the value of the decrease degree in the sharpness may be separately held, and this correction value may also be added to the pixel value of the input image data. In addition, a gamma (γ) value in accordance with the decrease degree in the sharpness may be previously held, and the sharpness of the input image data may be emphasized by related-art γ correction processing using the held γ value. In addition, a plurality of related-art edge emphasis filters having different emphasis degrees for emphasizing minute parts of the image may be held, and the edge emphasis filter may be appropriately selected to be used in accordance with the decrease degree in the sharpness.

In addition, according to the present embodiment, after the generation of the projection image data is performed on the basis of the input image data, the generation of the formation image data is performed, but the processing according to the present embodiment is not limited to the above-described single example. For example, the projection image data is previously generated on the basis of the input image data to be stored in the HDD 1412 or the like. The input image data and the previously generated projection image data are obtained, and the formation image data is generated on the basis of the input image data and the projection image data.

Second Embodiment

According to the first embodiment, the example has been described in which the sharpness of the image represented by the input image data is emphasized on the basis of the decrease degree in the sharpness calculated from the projection image data and the input image data, and the formation image data is generated. However, the luminance range that can be represented by the formed image 501 changes in accordance with the environmental light decided by the illumination 4. That is, the formed image 501 is an image representing an image recorded by reflecting irradiated light. For this reason, in a case where the illumination light amount is low (dark), the luminance range that can be represented by the formed image 501 tends to be narrow, and on the other hand, in a case where the illumination light amount is high (bright), the luminance range that can be represented by the formed image 501 tends to be wide. In view of the above, according to the present embodiment, the emphasis degree of the processing for emphasizing the sharpness is controlled by taking into account the luminance range of the formed image 501 that changes in accordance with the environmental light as described above. As a result, it is possible to reduce the fluctuation in the effect of suppressing the decrease in the sharpness due to the environmental light. With regard to an example in which the above-described processing is realized, a different aspect from the first embodiment will be mainly described.

Functional Configuration of Image Processing Apparatus 1

Figure 8:
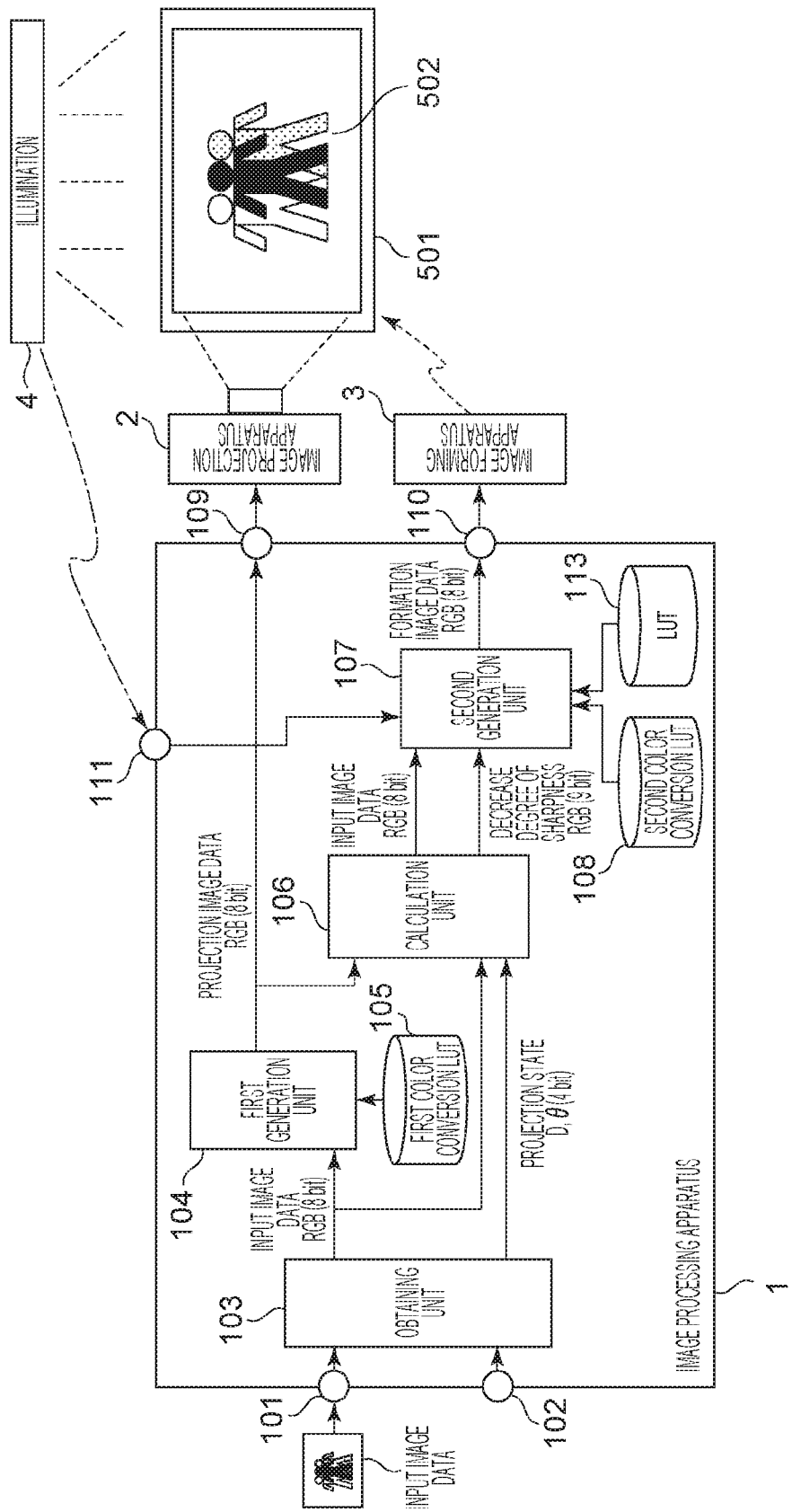
FIG. 8 is a block diagram illustrating an example of the functional configuration of the image processing apparatus 1.

The functional configuration of the image processing apparatus 1 will be illustrated in FIG. 8. The second generation unit 107 obtains environmental light information via a fourth output terminal 111. The environmental light information is 4-bit data representing an intensity of the environmental light with which the superimposed image is irradiated. The environmental light information is obtained by an input by the user or may be directly obtained by connecting the illumination 4 and the image processing apparatus 1 to each other. It should be noted that the obtainment of the environmental light information is not limited to the above-described single example. For example, pieces of intensity information of light in previously assumed observation scenes of the superimposed image (such as outdoor clear weather, outdoor cloudy weather, indoor spotlight lighting, and indoor office lighting) may be respectively held, and the intensity information of the light under a condition that is input and determined by the user as the closest condition may also be obtained. Since the configurations other than the above-described configuration are similar to those of the first embodiment, descriptions thereof will be omitted.

Processing Contents of Image Processing Apparatus 1

S204 which is different from the first embodiment will be described as processing contents according to a second embodiment. In S204, the decrease degree in the sharpness calculated in S203 is corrected on the basis of the environmental light information obtained by the fourth output terminal 111, and the sharpness of the image represented by the input image data is emphasized on the basis of the corrected decrease degree in the sharpness. Furthermore, similarly as in the first embodiment, the previously held second color conversion LUT 108 is referred to on the basis of the input image data representing the image in which the sharpness has been emphasized to generate the formation image data. The emphasis processing is realized when the addition processing of the decrease in the sharpness component which has been compensated by the correction coefficient in accordance with the environmental light information is performed with respect to the pixel value of the input image data where the resolution conversion has been performed. As described above, the formed image 501 is the image representing an image recorded by reflecting the irradiated light. For this reason, in a case where the environmental light amount is low, the luminance range that can be represented by the formed image 501 tends to be narrow, and on the other hand, in a case where the environmental light amount is higher, the luminance range that can be represented by the formed image 501 tends to be wide. Therefore, in a case where the environmental light amount is low as compared with a case where the environmental light amount is high, a correction for further emphasizing the sharpness component that is represented by only the formed image 501 and is not fully represented by the projected image 502 is performed, so that it is possible to reduce a fluctuation in effect for suppressing the decrease in the sharpness due to the change of the environmental light. Hereinafter, detailed processing contents will be described.

First, an LUT 113 that holds a correspondence relationship between the previously held the environmental light information and the correction coefficient is referred to, and a correction coefficient Z is decided by the environmental light information. An example of the LUT 113 is illustrated in FIG. 6. With regard to the LUT 113, the luminance range that can be represented by the formed image 501 is measured for each observation environment where the environmental light is previously changed, and a decision is made in accordance with a luminance range ratio. Similarly as in S2033, the addition processing is independently performed in each of the channels of R, G, and B with regard to the respective pixels of the respective images. A pixel value in the R plane of the input image data is set as $I\_R_{x,y}$ (x denotes the pixel position in the horizontal direction, and y denotes the pixel position in the vertical direction), the pixel value on the R plane at the decrease degree in the sharpness is set as $Q\_R_{x,y}$, and a pixel value in the R plane of the input image data after the emphasis processing is set as $I\_R'_{x,y}$. Furthermore, the correction coefficient Z is used to calculate $I\_R'_{x,y}$ on the basis of the following expression (7).

$$I\_R'_{x,y} = I\_R_{x,y} + (Q\_R_{x,y}) \times Z \qquad (7)$$

As described above, when the emphasis degree of the emphasis processing with respect to the input image data in accordance with the environmental light is controlled, the fluctuation in the effect of suppressing the decrease in the sharpness due to the environmental light can be reduced.

Modified Example

It should be noted that the example has been illustrated in which the conversion LUT 113 for the conversion which holds the correspondence relationship between the environmental light information and the correction coefficient is held according to the present embodiment, but the configuration is not limited to the above-described single example. For example, a calculation expression for predicting the correspondence relationship between the environmental light information and the correction coefficient may be constructed, and the correction coefficient may also be calculated in accordance with the environmental light information input by using the above-described calculation expression.

In addition, the example has been illustrated in which the single data is used as the environmental light information according to the present embodiment, but the configuration is not limited to the above-described single example. For example, two-dimensional environmental light information similar to the input image data may be obtained on the basis of the environmental light information for each area of the formed image 501, and the emphasis degree of the emphasis processing in accordance with the environmental light information for each area (pixel) of the input image data may be controlled.

Third Embodiment

According to the first embodiment, the example has been described in which the sharpness of the image represented by the input image data is emphasized on the basis of the decrease degree in the sharpness calculated from the projection image data and the input image data, and the formation image data is generated. As described above, with regard to the resolution $R_p$ of the projected image, the resolution changes in accordance with the expansion rate of the image. For this reason, for example, in a case where the input image is reduced to be displayed (a case where the expansion rate E is below 1), the resolution $R_p$ of the projected image may be higher than the resolution $R_f$ of the formed image in some cases. In view of the above, according to the present embodiment, the decrease degree in the sharpness which occurs in the formed image is predicted on the basis of the input image and the expansion rate E, and the sharpness of the projected image is emphasized on the basis of the predicted decrease degree in the sharpness. With regard to an example in which the above-described processing is realized, a different aspect from the first embodiment will be mainly described. It should be noted that, according to the present embodiment, since the expansion rate E is below 1, the expansion rate E will be referred to as a reduction rate S. The reduction rate mentioned herein is a magnification used when the image is to be reduced.

Functional Configuration of Image Processing Apparatus 1

Figure 20:
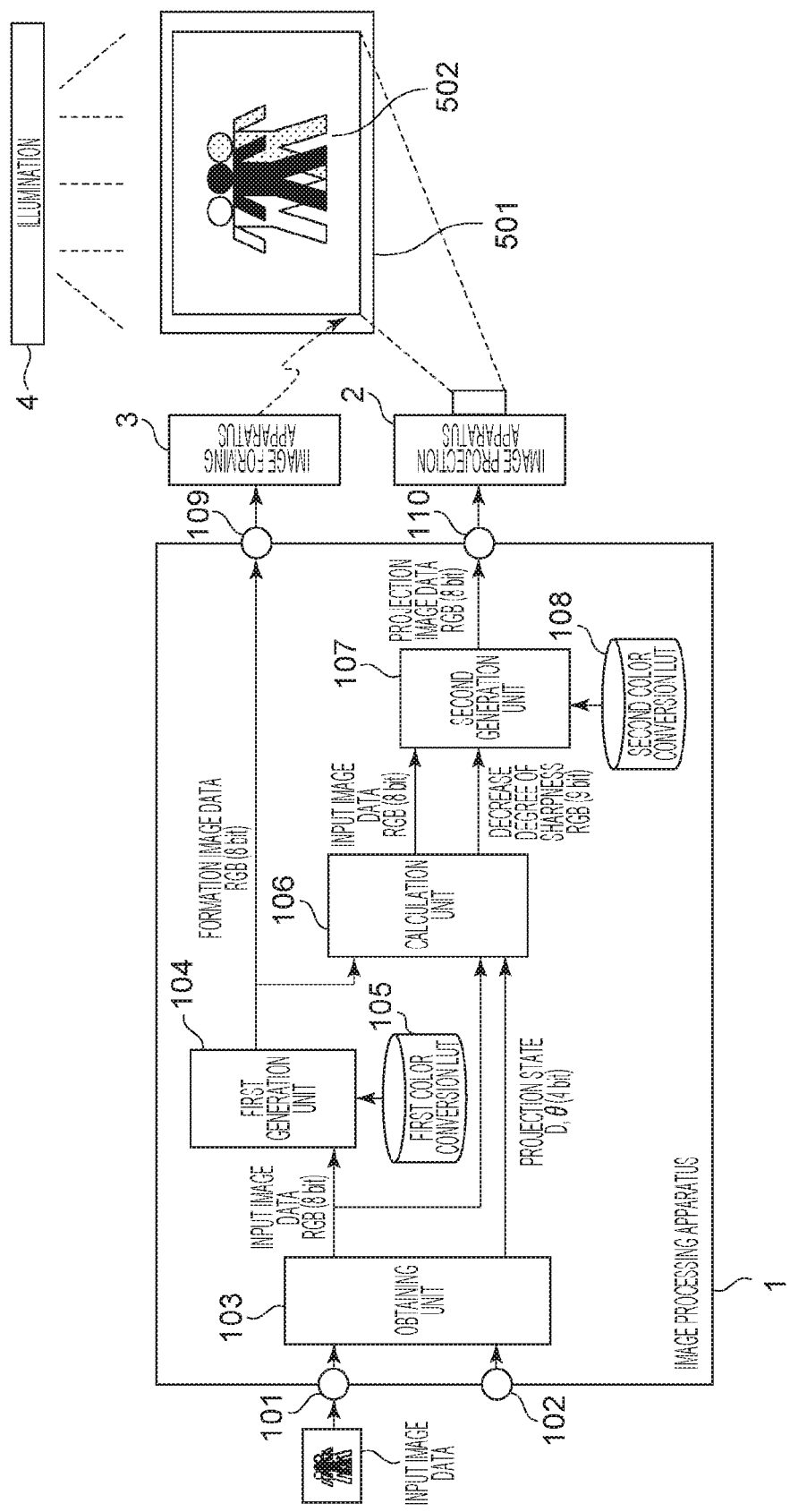
FIG. 20 is a block diagram illustrating a functional configuration of the image processing apparatus 1.

The functional configuration of the image processing apparatus 1 will be illustrated in FIG. 20. With the configuration of the image processing apparatus 1 according to the present embodiment, the image processing apparatus 1 is connected to the image projection apparatus 2 via the second output terminal 110, and the image processing apparatus 1 is connected to the image forming apparatus 3 via the first output terminal 109. The first generation unit 104 refers to the color conversion LUT 105 on the basis of the input image data and generates the image data input to the image forming apparatus 3 (formation image data). The calculation unit 106 obtains the input image data and the formation image data and converts the resolution of the image represented by the input image data and the resolution of the image represented by the formation image data in accordance with the projection state. Furthermore, the decrease degree in the sharpness of the image represented by the formation image data with respect to the image represented by the input image data is calculated on the basis of the input image data and the formation image data which represent the images in which the resolution has been converted. The second generation unit 107 emphasizes the sharpness of the image represented by the input image data on the basis of the input image data and the decrease degree in the sharpness. Furthermore, the second color conversion LUT 108 is referred to on the basis of the input image data representing the image in which the sharpness has been emphasized, and image data (projection image data) to be input to the image projection apparatus 2 is generated. The formation image data generated by the first generation unit 104 is output to the image forming apparatus 3 via the first output terminal 109, and the projection image data generated by the second generation unit 107 is output to the image projection apparatus 2 via the second output terminal 110.

Processing Contents of Image Processing Apparatus 1

Next, the processing contents of the image processing apparatus 1 provided with the above-described functional configuration will be described with reference to a flow chart of FIG. 2B. Since S201 is similar to the first embodiment, descriptions thereof will be omitted, and S202', S203', and S204' will be described.

In S202', the first generation unit 104 converts the resolution of the image represented by the input image data obtained by the obtaining unit 103 on the basis of the number of pixels of the image output by the image forming apparatus 3. The related-art bicubic method is used for the conversion of the resolution, but another resolution conversion method such as the bilinear method may also be used. Furthermore, the previously held color conversion LUT 105 is referred to on the basis of the input image data representing the image in which the resolution has been converted, and the formation image data is generated. Since the color conversion LUT 105 to which the reference is made is the same as the second color conversion LUT 108 according to the first embodiment, descriptions thereof will be omitted. In S203', the calculation unit 106 obtains the input image data and the projection state obtained in S201 and the formation image data generated in S202'. Furthermore, the reduction rate S of the size of the image projected by the image projection apparatus 2 with respect to the size of the image represented by the input image data is calculated on the basis of the obtained projection state. The resolution of the image represented by the formation image data and the resolution of the image represented by the input image data are converted on the basis of the calculated reduction rate S. After the resolution is converted, the decrease degree in the sharpness of the image represented by the projection image data with respect to the image represented by the input image data is calculated. The calculated decrease degree in the sharpness is transmitted to the second generation unit 107. In S204', the second generation unit 107 emphasizes the sharpness of the image represented by the input image data where the resolution conversion has been performed in S2033' on the basis of the decrease degree in the sharpness calculated in S203'. The emphasis of the sharpness is performed by the addition processing similarly as in the first embodiment. Furthermore, the previously held second color conversion LUT 108 is referred to on the basis of the input image data representing the image in which the sharpness has been emphasized, and the projection image data is generated. Since the second color conversion LUT 108 to which the reference is made is the same as the color conversion LUT 105 according to the first embodiment, descriptions thereof will be omitted.

Figure 5B:
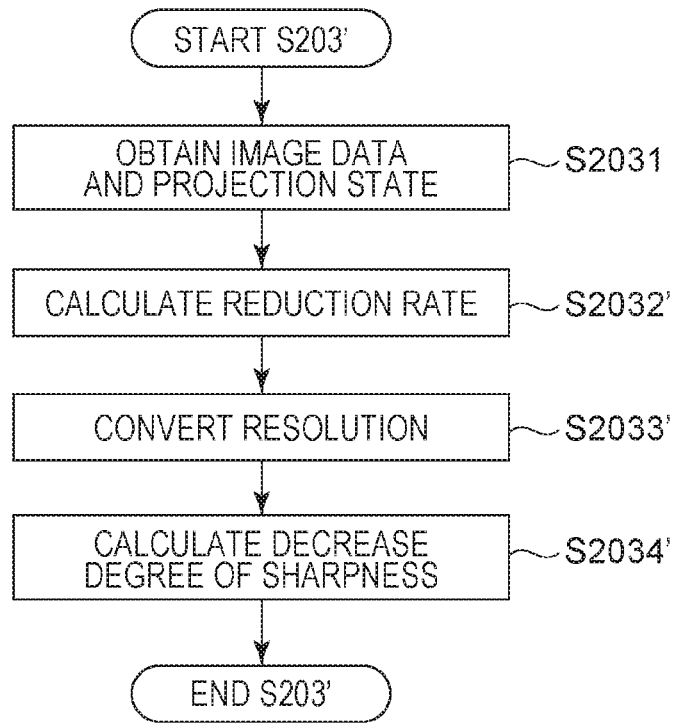
FIG. 5B is a flow chart with regard to the processing (S203) for calculating the decrease degree of the sharpness.

Hereinafter, the detailed processing in S203' will be described with reference to the flow chart illustrated in FIG. 5B. In S2031', the calculation unit 106 obtains the input image data, the projection image data, and the projection state similarly as in the first embodiment. In S2032', the calculation unit 106 calculates the reduction rate S by using the following expression (8) on the basis of the obtained projection state (D and θ) and the projection state (the projection distance $D_0$ and the field angle $\theta_0$) in which the size of the image represented by the input image data becomes the same size as the size of the projected image.

$$S = D/D_0 + \theta/\theta_0 \tag{8}$$

In S2033', the calculation unit 106 converts the resolution of the image represented by the input image data and the resolution of the image represented by the formation image data on the basis of the reduction rate S calculated in S2032' and the resolution $R_p$ of the image projected by the image projection apparatus 2. In the resolution conversion of the image represented by the formation image data, a magnification $F_f$ of the formation image data is calculated by using the following expression (9) on the basis of the reduction rate S and the resolution $R_p$ and the resolution $R_f$ of the image formed by the image forming apparatus 3.

$$F_f = (R_p/S)/R_f \tag{9}$$

The resolution conversion of each of the pixels of the formation image data into $F_f$ pieces is performed on the basis of on the basis of the calculated magnification $F_f$. The related-art nearest neighbor method is used for this resolution conversion. It should be noted that another method such as the bicubic method may also be used for the conversion of the resolution instead of the nearest neighbor method. Similarly, in the resolution conversion of the image represented by the input image data, first, the magnification $F_{in}$ of the input image data is calculated by using the following expression (10) on the basis of the reduction rate S, the resolution $R_p$, and the resolution $R_{in}$ of the image represented by the input image data.

$$F_{in} = (R_{in}/E)/R_p \tag{10}$$

The resolution conversion of each of the pixels of the input image data into $F_{in}$ is performed on the basis of the calculated magnification $F_{in}$. The related-art bicubic method is used for this resolution conversion. It should be noted that the above-described resolutions $R_f$ and $R_p$ are obtained by the input by the user or directly obtained by connecting the image projection apparatus 2 or the image forming apparatus 3 to the image processing apparatus 1. The resolutions $R_f$ and $R_p$ are preferably set as the highest resolutions that can be output by the respective devices.

In S2034', the calculation unit 106 performs the subtraction processing of the pixel value of the input image data representing the image where the resolution conversion has been performed in S2033' and the pixel value of the formation image data and sets a difference obtained as a result of the subtraction processing as the decrease degree in the sharpness. Since a method for calculating the decrease degree in the sharpness and generating the image in which the sharpness of the input image has been emphasized is similar to the first embodiment, descriptions thereof will be omitted.

When the above-described processing control is performed, the decrease in the sharpness of the formed image (decrease in contrast in the minute parts) with respect to the image of the reproduction target can be compensated by emphasizing the sharpness of the projected image. As a result, it is possible to suppress the decrease in the sharpness in the superimposed image obtained by superimposing the projected image that has been projected by the image projection apparatus 2 on the formed image that has been formed by the image forming apparatus 3.

Modified Example

Figure 21:
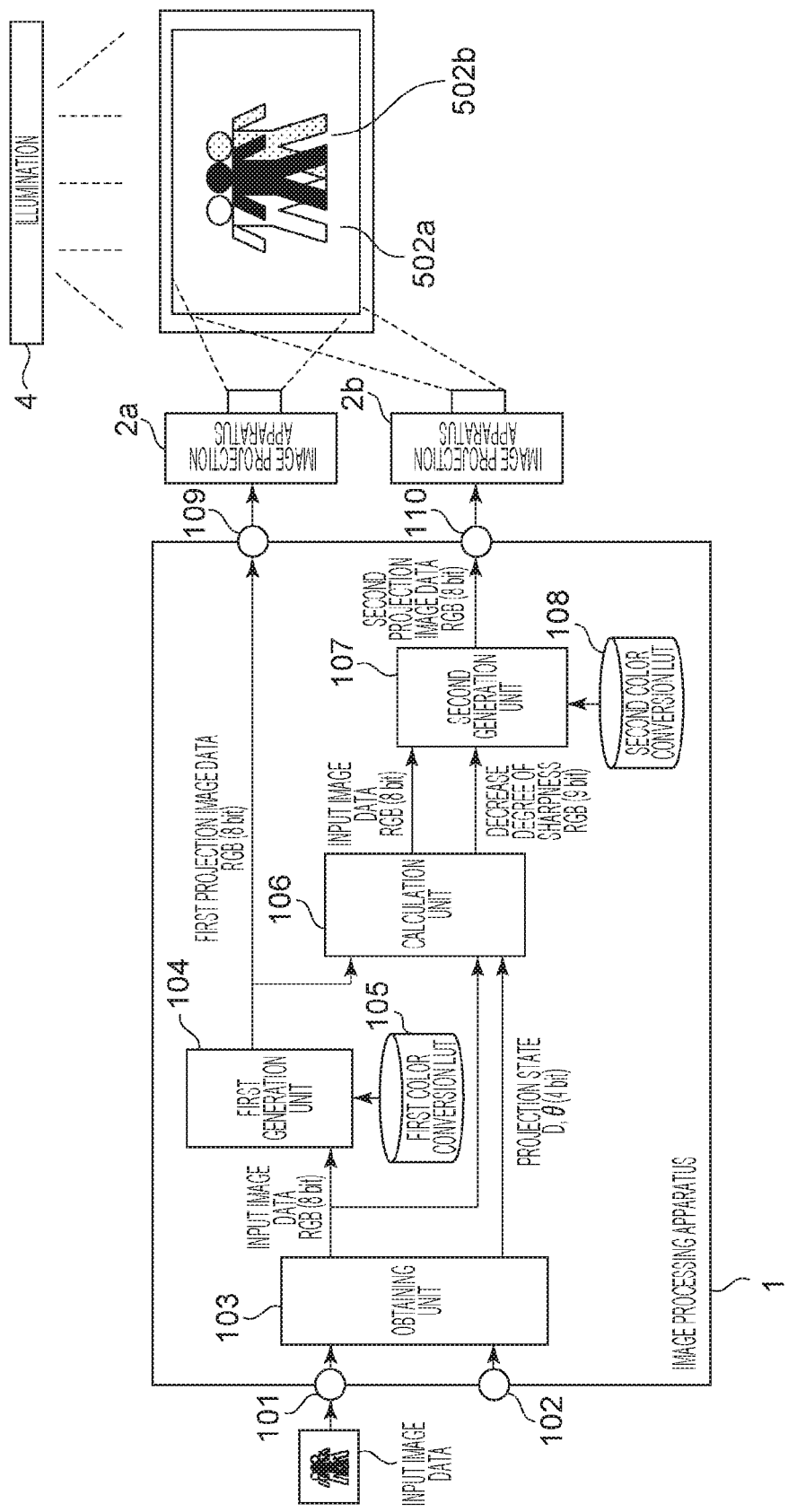
FIG. 21 is a block diagram illustrating the functional configuration of the image processing apparatus 1.

It should be noted that, according to the present embodiment, the example has been described in which the decrease in the sharpness which occurs in the superimposed image of the projected image by the image projection apparatus 2 and the formed image by the image forming apparatus 3 is suppressed. However, the combination of the apparatuses configured to generate the superimposed image is not limited to the above-described single example. Any combination may be adopted as long as, in a case where a superimposed image obtained by superimposing images output by two image output apparatuses having different resolutions that can be represented on each other is to be generated, the decrease in the sharpness which occurs in the output image by the apparatus having the lower resolution that can be represented is compensated by the output image by the apparatus having the higher resolution that can be represented. For example, as illustrated in FIG. 21, while a plurality of image projection apparatuses having different resolutions that can be represented are used, the decrease in the sharpness of the projected image by a first image projection apparatus 2a having a lower resolution may also be compensated by a projected image by a second image projection apparatus 2b having a higher resolution that can be represented.

In addition, according to the above-described embodiment, the example has been described in which the image projection apparatus configured to project the image and the image forming apparatus configured to form the image on the recording medium are used as the apparatus configured to output the image, but the above-described processing can be applied to image output apparatuses other than the image projection apparatus and the image forming apparatus. Any combination of two or more image output apparatuses that can generate the superimposed image may be used as the combination of the apparatuses. For example, an image display apparatus such as a liquid crystal display or an organic electroluminescence (EL) display may also be used. As an example in which a superimposed image is generated by using the image display apparatus, an image is formed on a recording medium through which light is transmitted such as an OHP sheet by the image forming apparatus, and the OHP sheet on which the image has been formed is placed on the image display apparatus. In this manner, the above-described processing can also be applied to the superimposing of the images in a case where one is the formed image formed by the image forming apparatus, and the other one is the display image displayed by the image display apparatus.

Fourth Embodiment

According to the above-described embodiment, the example has been illustrated in which the decrease in the sharpness generated in the output image by the image output apparatus in which the resolution that can be represented is decreased in accordance with the image size of the superimposed image is compensated by the output image by the image output apparatus having the higher resolution that can be represented. However, the decrease in the sharpness of the superimposed image is not limited to the decrease in the sharpness in accordance with the size of the superimposed image. The decrease in the sharpness of the image also occurs in accordance with an output characteristic of the image output apparatus. For example, the sharpness of the image formed by the image forming apparatus is decreased as compared with the input image due to a landing position deviation of a coloring material (ink), bleeding (mechanical dot gain) when the coloring material is fixed on the recording medium, optical blur (optical dot gain), or the like. According to the present embodiment, an example will be described in which the decrease in the sharpness in accordance with the output characteristic of the image output apparatus is also suppressed in addition to the decrease in the sharpness in accordance with the size of the superimposed image. According to the present embodiment, an output characteristic of the image forming apparatus 3 (characteristic of the sharpness of the formed image) is measured, and a filter having an inverse characteristic to the measured characteristic on a frequency space (hereinafter, referred to as a compensation filter) is previously created. Convolution processing using the previously created filter is performed on the input image data. When the processing according to the third embodiment is executed on the basis of the input image data on which the convolution processing has been performed, not only the decrease in the sharpness in accordance with the size of the superimposed image but also the decrease in the sharpness in accordance with the output characteristic of the image output apparatus are suppressed. With regard to an example in which the above-described processing is realized, a different aspect from the third embodiment will be mainly described.

Figure 22:
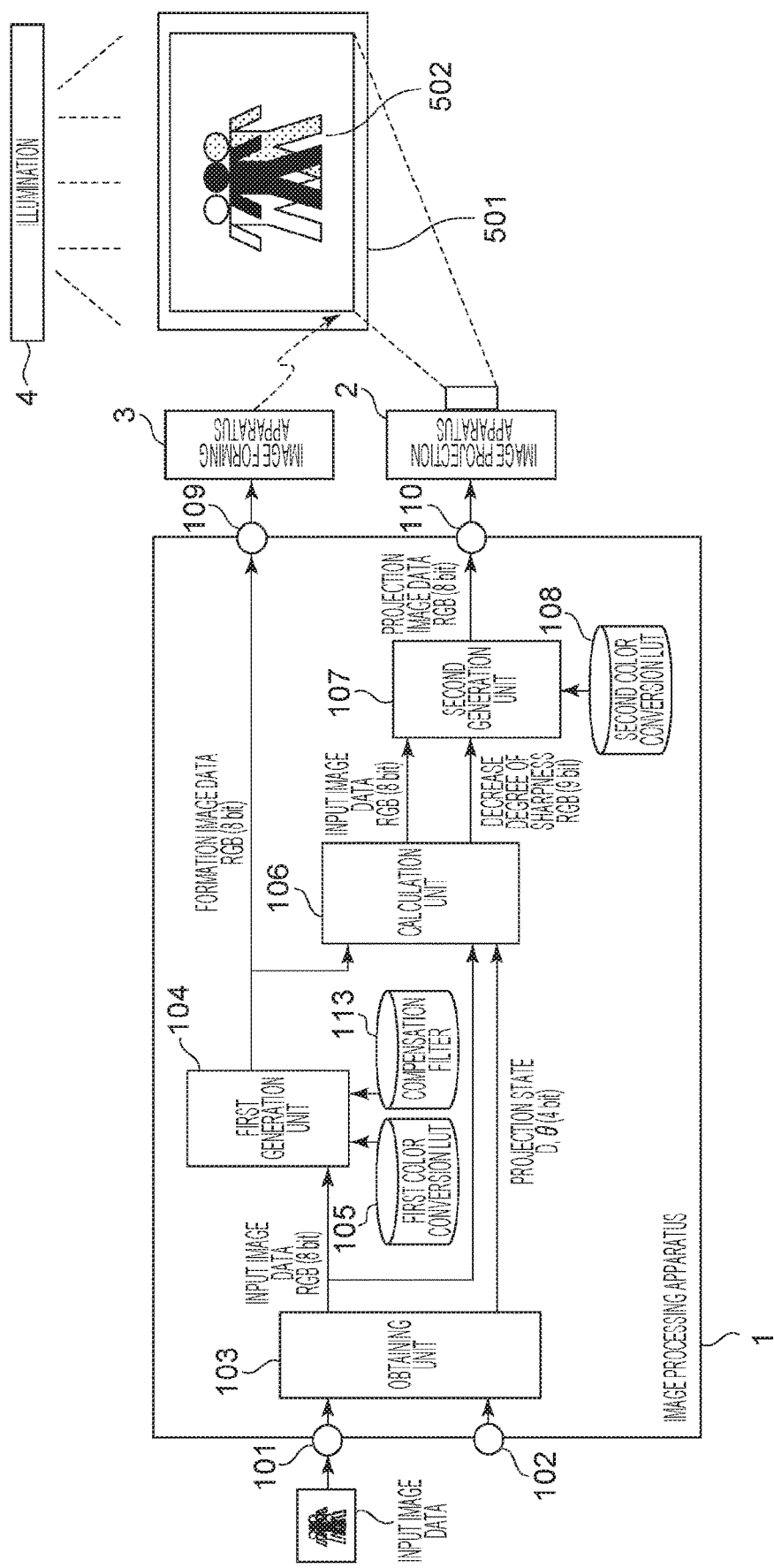
FIG. 22 is a block diagram illustrating the functional configuration of the image processing apparatus 1.

Functional Configuration of Image Processing Apparatus 1 and Processing Contents The functional configuration of the image processing apparatus 1 according to the fourth embodiment is illustrated in FIG. 22. In addition to the configuration of the third embodiment, a compensation filter 113 having an inverse characteristic with respect to the output characteristic of the image forming apparatus 3 is previously provided. Since the processing flow is similar to the third embodiment except for S202', descriptions thereof will be omitted, and S202' different from the third embodiment will be described. In S202', the first generation unit 104 converts the resolution of the image represented by the input image data obtained by the obtaining unit 103 on the basis of the number of pixels of the output image of the image forming apparatus 3. Furthermore, the convolution processing using the previously provided compensation filter in accordance with the output characteristic of the image forming apparatus 3 is performed with respect to the input image data in which the resolution has been converted. Hereinafter, a creation method for the previously created compensation filter will be described.

Creation Method for Compensation Filter

Figure 23:
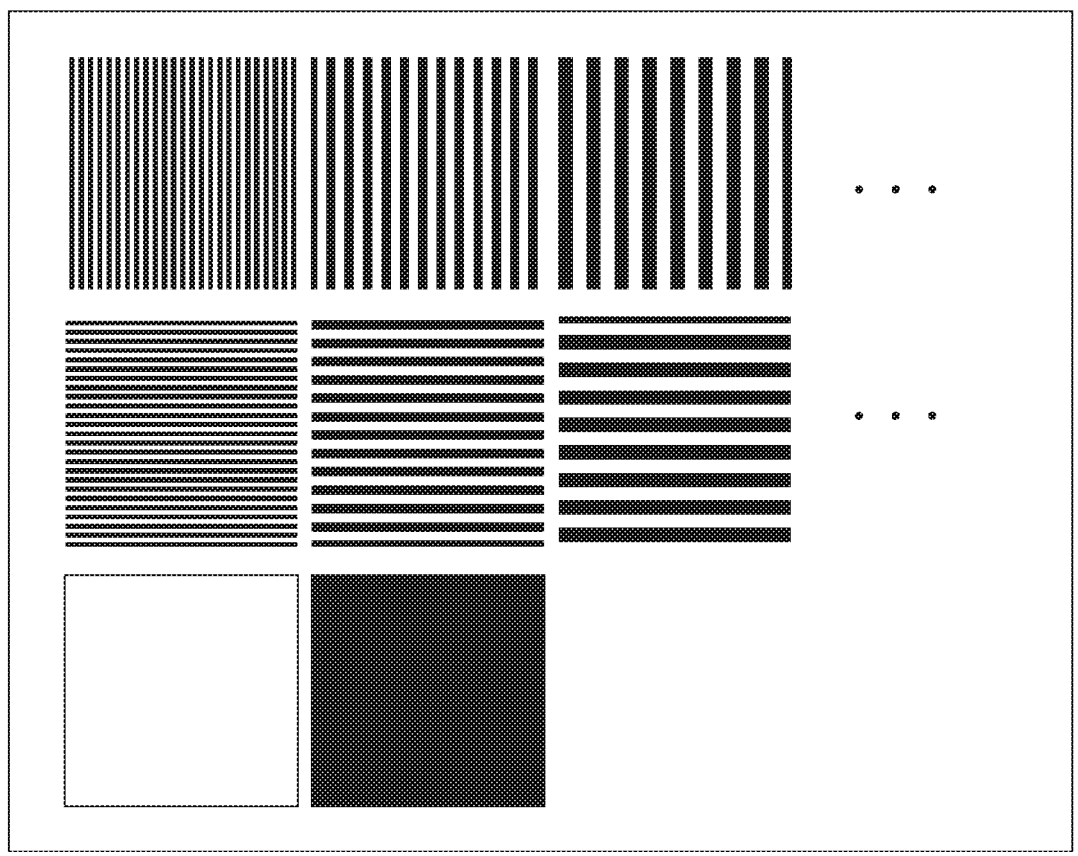
FIG. 23 illustrates an example of a chart for measuring an output characteristic of an image forming apparatus 3.

The compensation filter is created by printing a chart illustrated in FIG. 23 including a plurality of sinusoidal pattern images having different frequencies and uniform pattern images on the recording medium and measuring the printed chart. Hereinafter, a detail of the creation method for the compensation filter will be described.

First, a reflectivity distribution of the output chart is obtained by using a related-art image obtaining apparatus (such as a scanner, a camera, or a microscope). A frequency response value fi(u) corresponding to the output characteristic of the image forming apparatus 3 is calculated by using the obtained reflectivity distribution on the basis of the following expression (11). u denotes a sinusoidal frequency, and Max(u) and Min(u) respectively denote a maximum reflectivity and a minimum reflectivity of the image which change in accordance with the frequency u. Furthermore, in the expression (11), each of White and Black denotes a reflectivity of the uniform pattern.

$$fi(u)=MTF(u)=C(u)/C'$$

$$C(u)=(Max(u)-Min(u))/(Max(u)+Min(u))$$

$$C'=(White-Black)/(White+Black) \qquad (11)$$

Next, a frequency characteristic Rx of the compensation filter is calculated by using the obtained frequency response value fi(u) and the following expression (12).

$$Rx(u)=1/fi(u) \qquad (12)$$

A related-art inverse Fourier transform is performed with respect to Rx described above, and the filter calculated by the inverse Fourier transform is used as the compensation filter. It should be noted that, when components up to high frequency components are compensated by using the above-described compensation filter, noise generation or luminance fluctuation occurs. In view of the above, with regard to 4 Cycle/mm or higher where a sensitivity in terms of a visual characteristic is low which is found in a related art, a compensating intensity (emphasis degree) is preferably decreased to be lower than 4 Cycle/mm.

When the above-described processing control is performed, the input image data for compensating the decrease in the sharpness which occurs in accordance with the output characteristic at the time of the formation of the formed image can be generated. As a result, in addition to the decrease in the sharpness in accordance with the size of the superimposed image, the decrease in the sharpness in accordance with the output characteristic of the image output apparatus can also be suppressed.

Modified Example

It should be noted that, according to the present embodiment, the example has been illustrated in which the decrease in the sharpness due to the output characteristic (such as the landing position deviation of the coloring material, the bleeding, or the optical blur) of the image formed by the image forming apparatus 3 is previously measured, and the emphasis processing is performed on the input image. However, the apparatus where the sharpness decrease in accordance with the output characteristic occurs is not limited to the image forming apparatus 3. The sharpness is also decreased in the image projection apparatus 2 due to the optical blur of the projector lens. In addition, the optical blur occurs due to the liquid crystal panel in the image display apparatus such as the display, and the sharpness is decreased. The processing according to the present embodiment can also be applied to the sharpness decrease in accordance with these output characteristics of the image output apparatus. It should be noted that the example has been illustrated in which the compensation in accordance with the output characteristic is applied to one of the plurality of apparatuses included according to the present embodiment, but a configuration is preferably adopted in which the compensation processing in accordance with the output characteristics of the respective apparatuses used in the generation of the superimposed image is performed.

In addition, according to the present embodiment, the example has been illustrated in which one filter having the inverse characteristic to the output characteristic of the image formed by the image forming apparatus 3 is previously held, and the processing for emphasizing the sharpness of the input image is performed. However, the above-described output characteristic changes due to printing conditions of the image (such as a recording medium, a type of the ink, the number of passes, a carriage speed, a scanning direction, and halftone processing). For this reason, a plurality of inverse characteristic filters in accordance with the above-described printing conditions are held, and the processing is preferably switched in accordance with the printing conditions. In addition, without holding the plurality of inverse characteristic filters, the single inverse characteristic filter and the filter correction coefficient for each printing condition may be included, and the plurality of inverse characteristic filters may be generated by switching the filter correction coefficient in accordance with the printing condition.

In addition, according to the present embodiment, the emphasis processing of the sharpness by the inverse characteristic filter is performed with respect to the input image data, but the procedure of the image processing including the inverse characteristic filter is not limited to the above-described example. For example, after the output image data to be output to the respective image output apparatuses is generated by the processing according to the first embodiment, the inverse characteristic filter processing based on the output characteristics of the respective image output apparatuses may be performed.

In addition, the example in which the output characteristic is calculated by using the expression (11) has been described according to the present embodiment, but the calculation method for the output characteristic is not limited to the above-described example. In a case where an average luminosity of the output image changes in accordance with the sinusoidal frequency u, a response value in a dark part with respect to a bright part becomes excessive in the expression (11). For this reason, the following expression (13) is used in a case where the average luminosity of the output image changes.

$$fi(u)=MTF(u)=(Max(u)-Min(u))/(White-Black) \qquad (13)$$

It should be noted that Max(u), Min(u), White, and Black have been described as the reflectivity, but the luminance, the density, or the RGB values of the device may also be used. In addition, the chart for obtaining the output characteristic of the output image is not limited to the example illustrated in FIG. 23. As long as the responding property for each frequency can be calculated, a rectangular-wave pattern may also be used instead of the sinusoidal pattern. At this time, a CTF value calculated by applying the expression (11) to the rectangular-wave pattern is used as the frequency response value fi(u). As an alternative to the above-described configuration, while the CTF value is not set as the frequency characteristic, the conversion into an MTF value may be performed by using a related-art Coltman correction expression.

In addition, according to the present embodiment, the example has been described in which the inverse characteristic filter is previously generated and held, but an input unit for the user to input the reflectivity distribution of the chart may be included, and the inverse characteristic filter may be generated in accordance with the input reflectivity distribution.

According to the embodiments of the present invention, it is possible to suppress the decrease in the sharpness of the superimposed image with respect to the input image which occurs when the images output from the plurality of apparatus are superimposed on each other to generate the single image on the basis of the input image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus that generates, to generate an image by superimposing a first output image that is output from a first image output apparatus based on an input image and a second output image that is output from a second image output apparatus based on the input image and has a higher resolution than the first output image on each other, image data to be output to the second image output apparatus, the image processing apparatus comprising:
   one or more processors; and
   one or more memories storing instructions, when executed by the one or more processors, causes the image processing apparatus to function as:
   a first obtaining unit configured to obtain input image data representing the input image;
   a second obtaining unit configured to obtain first output image data to be output to the first image output apparatus which is generated based on the input image data, the first output image data representing the first output image; and
   a first generation unit configured to generate second output image data to be output to the second image output apparatus based on the input image data and the first output image data, the second output image data representing the second output image,
   wherein a sharpness of the second output image is in accordance with a sharpness of the first output image.

2. The image processing apparatus according to claim 1, wherein at least one of the first image output apparatus and the second image output apparatus is a projector.

3. The image processing apparatus according to claim 2, wherein the first image output apparatus is the projector, and the second image output apparatus is a printer.

4. The image processing apparatus according to claim 2, wherein both the first image output apparatus and the second image output apparatus are projectors.

5. The image processing apparatus according to claim 1, wherein one of the first image output apparatus and the second image output apparatus is a printer, and other one of the first image output apparatus and the second image output apparatus is a display.

6. The image processing apparatus according to claim 1, wherein the one or more memories storing instructions, when executed by the one or more processors, causes the image processing apparatus to further function as
   a second generation unit configured to generate the first output image data based on the input image data,
   wherein the second obtaining unit obtains the first output image data generated by the second generation unit.

7. The image processing apparatus according to claim 6, wherein the second generation unit converts a resolution of the input image data in accordance with the number of pixels of the image output by the first image output apparatus and generates the first output image data based on the input image data in which the resolution has been converted.

8. The image processing apparatus according to claim 1, wherein the one or more memories storing instructions, when executed by the one or more processors, causes the image processing apparatus to further function as
   a calculation unit configured to calculate a decrease degree in the sharpness of the image represented by the first output image data with respect to the sharpness of the image represented by the input image data based on the input image data and the first output image data,
   wherein the first generation unit generates the second output image data based on the decrease degree in the sharpness calculated by the calculation unit.

9. The image processing apparatus according to claim 8, wherein the one or more memories storing instructions, when executed by the one or more processors, causes the image processing apparatus to further function as
   a third obtaining unit configured to obtain a first magnification of a size of the first output image with respect to a size of the image represented by the input image data,
   wherein the calculation unit calculates a second magnification for performing resolution conversion on the input image data and the first output image data based on the first magnification, performs the resolution conversion on the input image data and the first output image data based on the second magnification, and calculates the decrease degree in the sharpness based on the input image data and the first output image data in which the resolution conversion has been performed.

10. The image processing apparatus according to claim 8, wherein the calculation unit calculates a difference between a pixel value of the input image data and a pixel value of the first output image data as the decrease degree in the sharpness.

11. The image processing apparatus according to claim 8, wherein the calculation unit calculates the decrease degree in the sharpness by applying a high-pass filter in accordance with the second magnification to the input image data.

12. The image processing apparatus according to claim 8, wherein the first generation unit emphasizes the sharpness of the image represented by the input image data based on the input image data and the decrease degree in the sharpness and generates the second output image data based on the input image data representing the image in which the sharpness has been emphasized.

13. The image processing apparatus according to claim 12, wherein the first generation unit performs the emphasis of the sharpness of the image represented by the input image data by adding a value representing the decrease degree in the sharpness to the pixel value of the input image data.

14. The image processing apparatus according to claim 12, wherein the first generation unit performs the emphasis of the sharpness of the image represented by the input image data by performing a gamma correction (γ correction) with respect to the input image data by using a γ value in accordance with the decrease degree in the sharpness.

15. The image processing apparatus according to claim 12, wherein the first generation unit performs the emphasis of the sharpness of the image represented by the input image data by performing an edge emphasis with respect to the input image data by using a filter in accordance with the decrease degree in the sharpness.

16. The image processing apparatus according to claim 1, wherein the one or more memories storing instructions, when executed by the one or more processors, causes the image processing apparatus to further function as
   a fourth obtaining unit configured to obtain an intensity of environmental light in an environment where the superimposing of images is performed,
   wherein the first generation unit further generates the second output image data based on the intensity of the environmental light.

17. The image processing apparatus according to claim 1, wherein the one or more memories storing instructions, when executed by the one or more processors, causes the image processing apparatus to further function as
- a fifth obtaining unit configured to obtain an output characteristic when at least one of images of the first image output apparatus and the second image output apparatus is output, wherein the first obtaining unit obtains the input image data corrected by using a filter in accordance with the output characteristic.

18. An image processing method of generating, to generate an image by superimposing a first output image that is output from a first image output apparatus based on an input image and a second output image that is output from a second image output apparatus based on the input image and has a higher resolution than the first output image on each other, image data to be output to the second image output apparatus, the image processing method comprising:

- obtaining input image data representing the input image;
- obtaining first output image data to be output to the first image output apparatus which is generated based on the input image data, the first output image data representing the first output image; and
- generating second output image data to be output to the second image output apparatus based on the input image data and the first output image data, the second output image data representing the second output image, wherein a sharpness of the second output image is in accordance with a sharpness of the first output image.

19. A non-transitory computer-readable storage medium storing instructions that, when executed by a computer, cause the computer to perform an image processing method of generating, to generate an image by superimposing a first output image that is output from a first image output apparatus based on an input image and a second output image that is output from a second image output apparatus based on the input image and has a higher resolution than the first output image on each other, an image data to be output to the second image output apparatus, the image processing method comprising:

- obtaining input image data representing the input image;
- obtaining first output image data to be output to the first image output apparatus which is generated based on the input image data, the first output image data representing the first output image; and
- generating second output image data to be output to the second image output apparatus based on the input image data and the first output image data, the second output image data representing the second output image, wherein a sharpness of the second output image is in accordance with a sharpness of the first output image.

* * * * *